United States Patent
Ward et al.

(10) Patent No.: US 6,894,706 B1
(45) Date of Patent: May 17, 2005

(54) AUTOMATIC RESOLUTION DETECTION

(75) Inventors: Paul A. Ward, The Woodlands, TX (US); Mark L. Reinke, Tomball, TX (US); Henry M. D'Souza, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 09/156,816

(22) Filed: Sep. 18, 1998

(51) Int. Cl.[7] .................................................. G09G 5/00
(52) U.S. Cl. ........................ 345/660; 345/428; 345/87
(58) Field of Search ........................................... 345/87

(56) References Cited

U.S. PATENT DOCUMENTS

| | | | | |
|---|---|---|---|---|
| 4,684,987 A | * | 8/1987 | Tsutsui | 348/543 |
| 4,864,289 A | * | 9/1989 | Nishi et al. | 345/473 |
| 4,991,027 A | * | 2/1991 | Enoki | 386/35 |
| 5,430,457 A | | 7/1995 | Zenda | 345/3 |
| 5,608,418 A | | 3/1997 | McNally | 345/3 |
| 5,619,226 A | * | 4/1997 | Cahill, III | 345/132 |
| 5,781,185 A | * | 7/1998 | Shin | 345/213 |
| 5,874,937 A | * | 2/1999 | Kesatoshi | 345/127 |
| 5,953,074 A | * | 9/1999 | Reddy | 348/558 |
| 5,986,636 A | * | 11/1999 | Wu | 345/132 |
| 6,014,121 A | * | 1/2000 | Aratani et al. | 345/89 |
| 6,078,317 A | * | 6/2000 | Sawada | 345/204 |
| 6,177,922 B1 | * | 1/2001 | Schiefer et al. | 345/132 |

* cited by examiner

*Primary Examiner*—Albert Decady
*Assistant Examiner*—Fritz Alphonse

(57) ABSTRACT

A system provides automatic mode detection and scaler control in a display device which is digitally coupled to a display controller. The display controller has a variable active horizontal resolution and a variable active vertical resolution, while the display device has a fixed display device horizonal resolution and a fixed display device vertical resolution. The system determines the variable active horizontal and the vertical resolutions of the display controller; and scales the output of the display controller to the fixed horizontal resolution and vertical resolution of the display device.

33 Claims, 23 Drawing Sheets

Mode Scaling Control Panel

Active Resolution
- ● 640 X 480
- ○ 800 X 600
- ○ 1024 X768
- ○ 1280 X 1024

System Output Resolution
- ○ 640 X480
- ○ 800 X 600
- ○ 1024 X768
- ○ 1280 X 1024
- ○ Center Mode

FIG. 13

Mode Scaling Control Panel

Active Resolution

- ● 640 X 480
- ○ 800 X 600
- ○ 1024 X768
- ○ 1280 X 1024

System Output Resolution

- ○ 640 X480
- ○ 800 X 600
- ○ 1024 X768
- ○ 1280 X 1024
- ○ Center Mode

FIG. 16

Mode Scaling Control Panel

Active Resolution
- ● 640 X 480
- ○ 800 X 600
- ○ 1024 X768
- ○ 1280 X 1024

System Output Resolution
- ○ 640 X480
- ○ 800 X 600
- ○ 1024 X768
- ○ 1280 X 1024
- ○ Center Mode

FIG. 17

AUTOMATIC RESOLUTION DETECTION

BACKGROUND

The invention relates to a video system capable of determining a display resolution and driving a wide range of video displays.

Continual advances in computer technology are making possible cost-effective, yet high performance computers capable of displaying high resolution images. A variety of display devices, including cathode ray tube (CRT) displays or thin-film-transistor (TFT) flat panel displays, may be used. These displays are driven by graphics peripherals such as video cards, which in turn are controlled by processors inside the computers.

Traditionally, due to their high cost, flat panel displays have been used only in notebook computers where size and low power requirements are important. As a notebook computer can drive its built-in flat panel display as well as an external CRT display, the video circuit of the notebook computer automatically handles differences between the CRT display and the flat panel display. In the controlled environment of the notebook computer, the maximum resolution of a flat panel display controller may be greater than or equal to that of the notebook computer's built-in flat panel display. However, in a desktop computer where a particular display attached to the desktop computer may be changed by a user, potential incompatibilities exist when a high resolution flat panel display is used with a desktop computer which is capable of driving only a low resolution flat panel display. For example, certain flat panel capable desktop computers are currently equipped with 65 megahertz (MHZ) video outputs and are limited to a resolution of 1024×768 pixels. When higher resolution flat panel displays become available, these flat panel displays may be incompatible with the original display circuits.

Computer systems capable of supporting both CRT displays as well as flat panel displays need to handle differences between the two types of display. For example, in the CRT display, an electron beam is swept horizontally across a line of the screen and, at the end of the line, the electron beam is moved vertically down to the next line before the horizontal sweep motion is repeated. Upon reaching the end of the screen, the electron beam is moved back to the origin of the screen and the process is repeated. These timing requirements are referred to as horizontal and vertical retrace timing requirements. The flat panel displays do not require as much time for horizontal and vertical blanking since they are digital devices which are addressed via internal counters and latches instead of an electron beam sweeping motion.

Also, each CRT display inherently has a variable resolution and accepts multiple input resolutions. "Multi-sync" circuitry is used to respond to video signals to control the CRT raster scan frequency. The CRT display's control signals include vertical sync (VSYNC), horizontal sync (HSYNC), and RED, GREEN, BLUE (RGB) signals. The HSYNC and VSYNC are signals defining horizontal and vertical raster frequency which are synchronized with the CRT display's logic. RED, GREEN and BLUE are analog signals which contain color data for each pixel. In contrast, the flat panel display operates at a fixed resolution and is controlled by video signals HSYNC, VSYNC, PIXCLOCK, RGBPIXDATA, and DATA_ENABLE. HSYNC and VSYNC are digital signals which provide similar function as the same named signals on a CRT interface. RGBPIXDATA is the digital RGB data and is typically 18–24 bits for each pixel. DATA_ENABLE identifies valid pixel data, which are latched with a pixel clock signal, PIXCLOCK. Also, a flat panel display controller typically has a maximum resolution limited by a maximum clock frequency supported from its video output circuitry. The controller supports resolutions below the fixed resolution of its flat panel display via circuitry in the flat panel display controller. This circuitry provides at a minimum the ability to center a low resolution display on the panel. Other flat panel display controllers provide circuitry for upscaling the low resolution to the high native resolution of the panel using either pixel replication, or line replication, or interpolation with filtering at various quality levels. However, incompatibilities may exist between the display controller in the computer and the controller in the flat panel display and which may affect the display quality.

SUMMARY

An apparatus and method support automatic mode detection and scaler control in a display device which is digitally connected to a display controller. In this system, the display controller may have a variable active horizontal resolution and a variable active vertical resolution, while the display device may have a fixed display device horizonal resolution and a fixed display device vertical resolution. The apparatus determines the variable active horizontal and the vertical resolutions of the display controller and scales the output of the display controller to the fixed horizontal resolution and vertical resolution of the display device.

Implementations of the invention include one or more of the following. The variable active horizontal resolution may be determined by counting a pixel clock. The counting of the pixel clock may be driven by a valid pixel signal. In one implementation, the valid pixel signal may be DATA_ENABLE. Also, the variable active vertical resolution may be determined by counting active horizontal lines between vertical sync pulses. The variable active horizontal lines may be determined by counting a horizontal sync pulse qualified with DATA_ENABLE between vertical sync pulses. In addition, the variable active horizontal lines may be determined by counting DATA_ENABLE between vertical sync pulses. Moreover, the apparatus may include assigning display device horizontal and vertical resolutions from a panel size decoder. The horizontal scale factor may be determined by dividing the fixed display device horizontal resolution by the determined horizontal resolution. Additionally, the vertical scale factor may be determined by dividing the fixed display device vertical resolution by the determined vertical resolution.

Advantages of the invention may include one or more of the following. The video scaling circuit in the flat panel display device avoids a potential resolution incompatibility between the controller in the computer system and the controller in the peripheral flat panel display device. The system also automatically engages the scaler circuitry with the correct scaling factor based on an automatic mode detection process to migrate from a native flat panel display resolution. Further, the system provides software with a user interface for selecting the highest quality of all potential scaler modes when video scalers in the controller and in the display device have overlapping capabilities.

The scaler system is cost-effective since it flexibly handles the cost and quality tradeoffs required on both the system-side and the monitor-side. Cost sensitive systems or displays can implement minimal centering/scaling functions. High end systems can provide high quality scalers and achieve high quality images even when combined with low cost displays. Thus, the system allows the computer to control its ultimate video quality.

Additionally, the invention provides an automatic scaler mode selection process which avoids user intervention and which supports optimum image quality without requiring any expertise in manually configuring the computer and the display device.

The invention also provides a display with an optimized mode centering capability. The invention also minimizes the bandwidth needed between the system and display for centering a lower resolution display mode on a higher resolution display by varying the line frequency so that it is much higher during times where no pixel data is supplied.

Other features and advantages will become apparent from the following description and from the claims.

BRIEF DESCRIPTION OF THE DRAWINGS

FIG. 13 is a diagram illustrating a first mode scaling control panel.

FIG. 16 is a diagram showing a fourth mode scaling control panel.

FIG. 17 is a diagram showing a fifth mode scaling control panel.

DESCRIPTION

Figure 1:
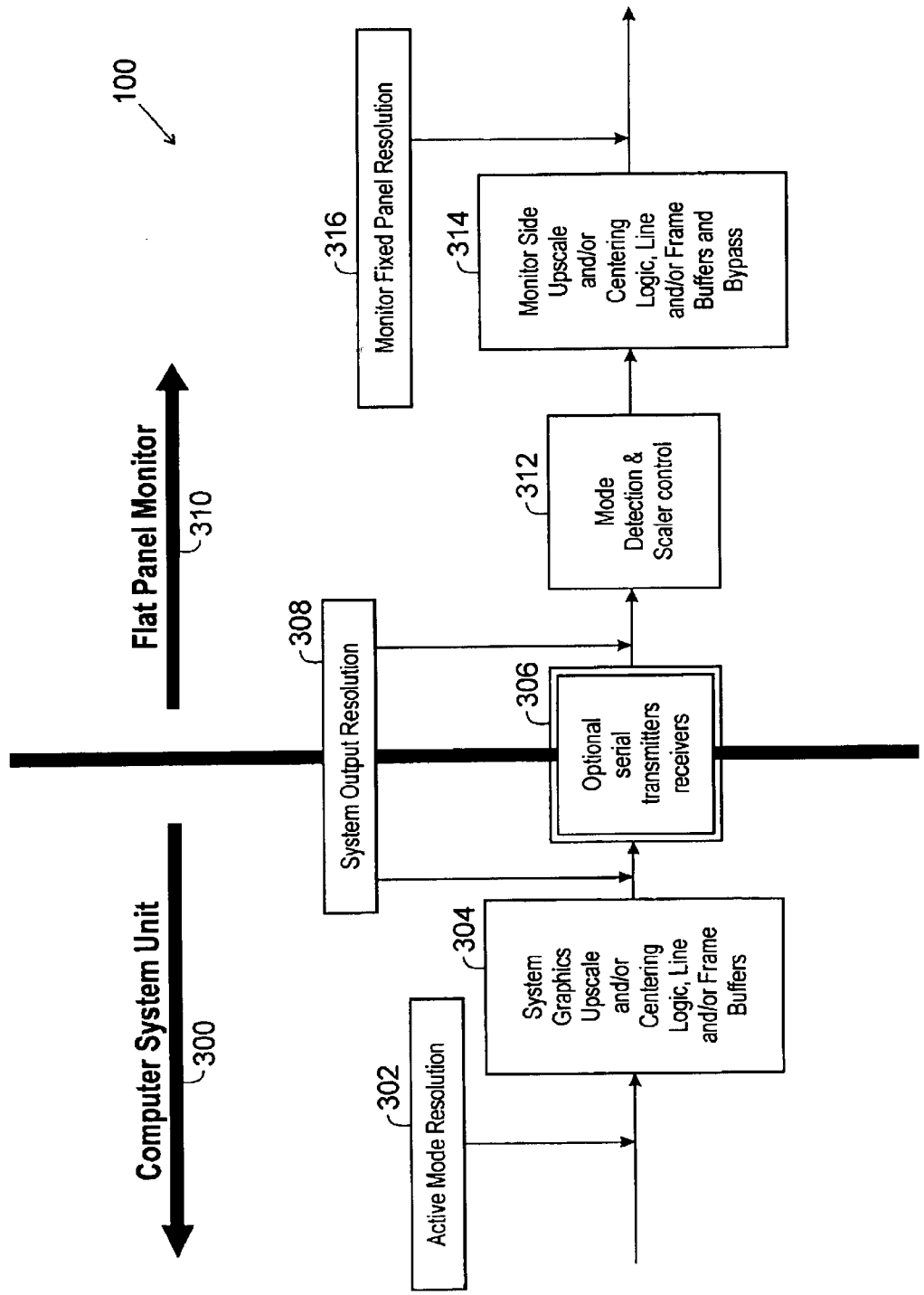
FIG. 1 is a schematic diagram illustrating an interface between a computer system and a display device.

Turning now to FIG. 1, a computer-display system 100 with automatic resolution detection capability is shown. The system 100 has a computer system unit side 300 and a digital flat panel monitor side 310. On the computer system side 300, an active mode resolution input 302 represents a selected display resolution. The selection of the active mode resolution is typically made via a display control application such as a Windows95 display control panel. This resolution corresponds to the resolution stored in the frame buffer memory of the system flat panel display controller.

The active mode resolution input 302 is provided to a system graphics upscale and/or centering logic block 304. Block 304 is generally contained in the flat panel display controller and may include line and/or frame buffers. Block 304 may be implemented with a variety of different cost/ quality and architectural tradeoffs. For instance, it may be limited to only allow centering of a low resolution mode in a high resolution display or it may include scaler functions to allow a low resolution image to be stretched to a fill screen. Further, the block 304 may support pixel/line replication only, or it may include multi-tap horizontal and vertical filters with line buffers and/or frame buffers required to support them.

The output of block 304 is provided to a system output resolution 308. The system output resolution 308 specifies a TFT format resolution that comes from the flat panel display controller output section. The output from block 304 may also optionally be provided to a serial transmitter and receiver block 306. The maximum pixel frequency could be limited by the serial transmitter interface if present or by circuitry in the graphics controller's display output pipeline. The limitation of this output is the source of potential incompatibility between a flat panel display controller and a flat panel display monitor. For example, if a system is capable of a maximum resolution of 1024×768 @60 Hz and a digital flat panel monitor has a resolution of 1280×1024, a basic incompatibility may exist between them. The incompatibility may be solved by adding video scaler and or centering logic with a video timing generator to the flat panel monitor.

The output of the system output resolution block 308, or optionally the serial transmitter and receiver block 306, is provided to a mode detection and scaler control block 312. Block 312 supports an automatic setup of the monitor scaler and does not rely on any direct host to monitor communication for control register setup. The mode detection and scaler control block 312 detects whether the resolution produced by the system flat panel display controller is the same as the flat panel display native resolution, which is a fixed resolution. If the resolution is the same, then the monitor side upscale and/or centering logic & buffers block 314 is bypassed. If different, the scale factor control data is provided as an input to the monitor side upscale and/or centering logic & buffers block 314. The block 314 may be limited to only allow centering of a low resolution mode in the higher resolution display or it could include scaler functions to allow the low resolution image to be stretched to full screen. Additionally, the block 314 may support pixel/ine replication only or it could include multi-tap horizontal and vertical filters with line buffers and/or frame buffers required to support them. It could potentially include frame buffer(s) to support refresh rate conversion as well.

The monitor side upscale and/or centering logic, line and/or frame buffer and bypass block 314 converts the resolution from the output of the flat panel display controller to the fixed flat panel display resolution. The output of block 314 is also controlled by a monitor fixed panel resolution block 316. In one embodiment, each of the resolution inputs 302, 308 and 316 is provided from a digital pixel interface with the RGB pixel data, HSYNC, VSYNC, pixel clock and DATA_ENABLE signals.

Figure 2:
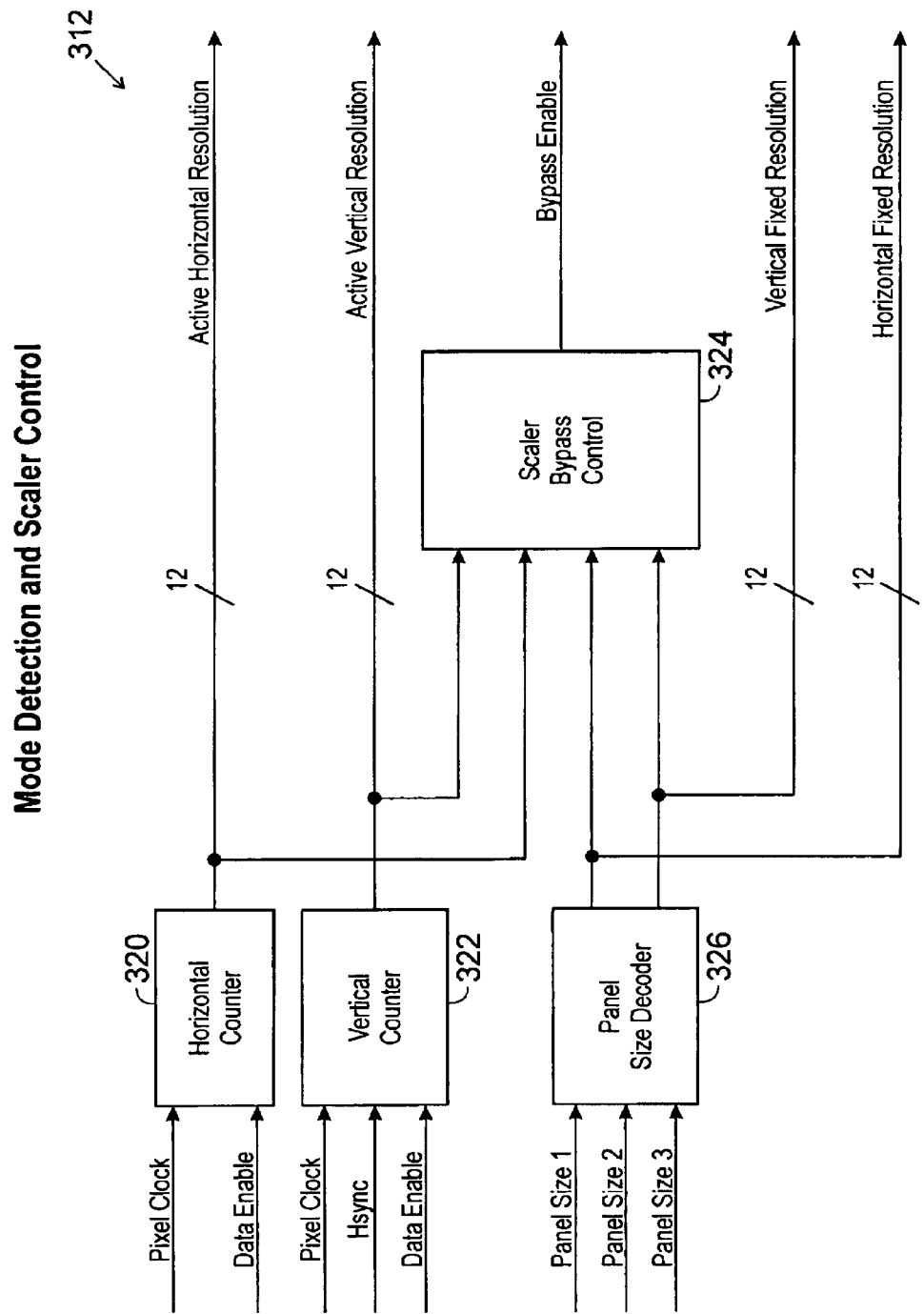
FIG. 2 is a circuit for performing video mode detection and scaler control.

Turning now to FIG. 2, a circuit 312 for detecting the display mode and controlling the scaler is illustrated in more detail. The circuit 312 stores data relating to a native resolution or fixed resolution of the flat panel display in order to detect a scaler bypass condition and to affect scale factors. In order to accommodate different standard panel sizes, encoded data relating to vertical and horizontal resolutions for different panel sizes may be provided. Pixel clock and data enable control signals are provided to a horizontal counter 320. The horizontal counter 320 counts the number of valid pixels between horizontal sync pulses, thus capturing the desired horizontal resolution from the system graphics upscale block 304. This is accomplished using the DATA_ENABLE signal to qualify the pixel clock as an input to the counter. Once the DATA_ENABLE signal becomes invalid, the counter output is latched for a continuous output. The counter is then reset and is allowed to count again when the DATA_ENABLE signal becomes active.

Similarly, the pixel clock, DATA_ENABLE and horizontal sync control signals are provided to a vertical counter 322. The vertical counter 322 counts the number of valid lines between vertical sync pulses thus capturing the desired vertical resolution from the system graphics upscale block 304. This is accomplished by counting active pulses that occur between the horizontal sync signal (HSYNC) and using DATA_ENABLE to qualify the counter input. The counter value may be latched on every vertical sync (VSYNC) pulse and output continuously. The counter would then be reset on the first clock after VSYNC and updated every frame so that any change in resolution may be detected.

The output of the horizontal counter 320 and the vertical counter 322 are provided to a scaler bypass control block 324. The scaler bypass control block 324 also receives inputs from a panel size decoder 326. If block 324 detects that the active horizontal resolution and the vertical resolution are equal to the fixed horizontal resolution and vertical resolution, then a "bypass enable" signal is activated. The panel size decoder 326 receives hard coded inputs from various pull-up/pull-down resistors. It provides outputs representing standard horizontal and vertical resolutions for a small range of different panel sizes. These are used as inputs for comparators in the scaler bypass control block 324 and as inputs to dividers in a monitor upscaling block 330 in FIG. 3.

Figure 3:
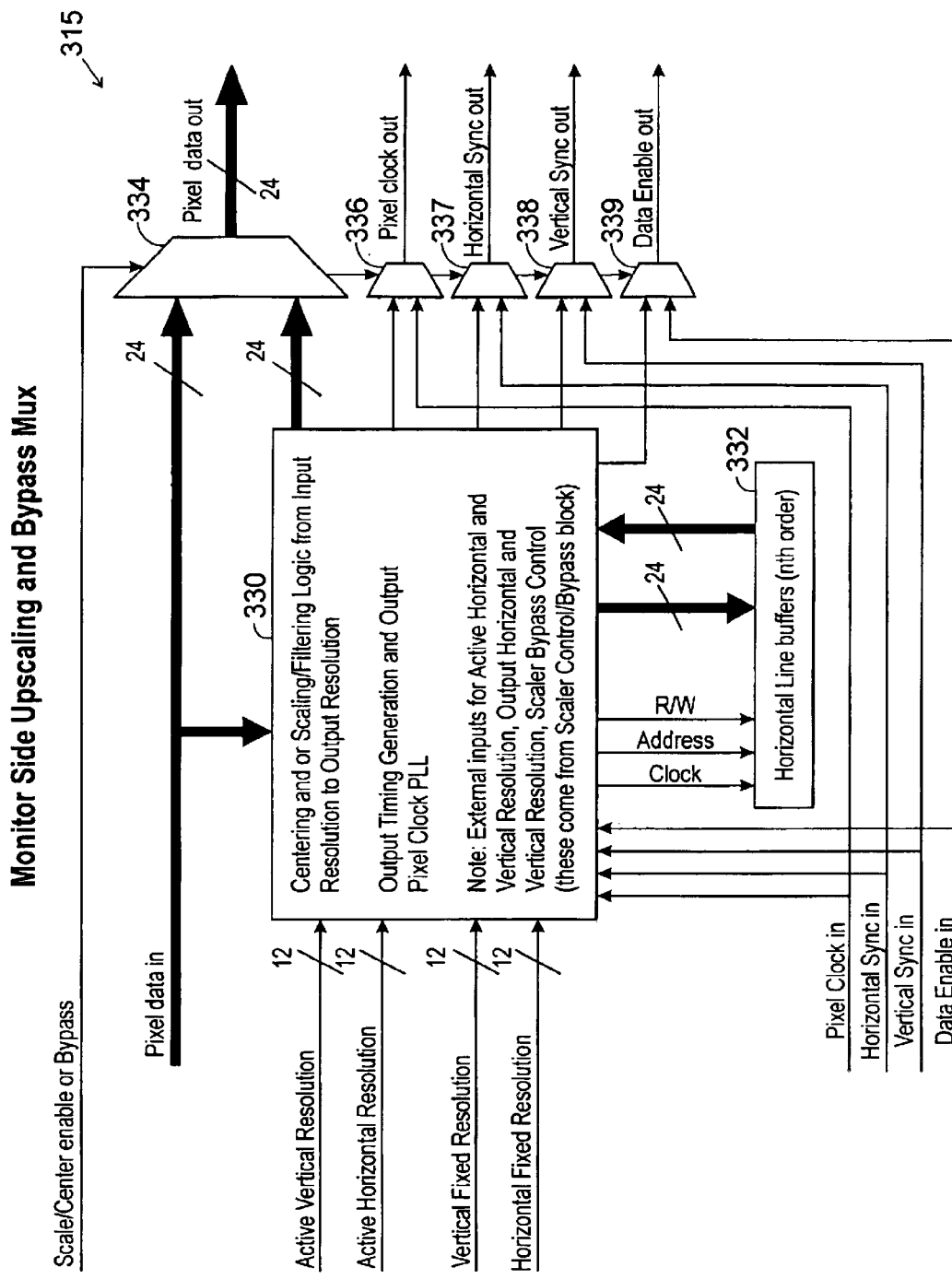
FIG. 3 is a circuit for performing video upscaling.

Turning now to FIG. 3, a circuit 315 for providing video upscaling and bypass is shown. The circuit 315 may be used as the system graphics upscale and/or centering logic, line and/or frame buffers block 304, or may be used as the monitor side upscale and/or centering logic, line and/or frame buffers and bypass block 314. The difference in the application of the circuit 315 is that the scaler in the display monitor side uses input signals provided by the mode detection and scaler control, while the scaler in the display controller can contain registers with the equivalent signal information provided by the CPU. Although possible, the processor in this embodiment does not directly program the display side scaler due to difficulty in accessing the display scaler signals as well as a lack of specific knowledge about scaler registers available on the display device.

The upscaling and bypass circuit 315 has a block 330 which performs centering and/or scaling/filtering logic from the input resolution to the output resolution. The block 330 also has output timing generators and an output pixel clock phase lock loop (PLL) device. Block 330 receives as input an active vertical resolution bus, an active horizontal resolution bus, a vertical fixed resolution bus and a horizontal fixed resolution bus. Additionally, the block 330 receives pixel data input and several other input signals, including a pixel clock input, a horizontal sync input, a vertical sync input, and DATA_ENABLE input. The block 330 is also connected to a horizontal line buffer 332. The block 330 controls the block 332 via a clock signal, an address bus, and a read/write signal. Further, data is transferred via a 24 bit bus between the horizontal line buffer 332 and the block 330. The block 330 in turn drives a pixel data output multiplexer 334. The multiplexer 334 also receives pixel data input bus and a scale/center enable or bypass control signal. The scale/center enable or bypass control signal is also provided to a pixel_clock_out multiplexer 336, a horizontal_sync_out multiplexer 337, a vertical_sync_out multiplexer 338 and a DATA_ENABLE_out multiplexer 339. Each of the multiplexers 336, 337, 338, and 339 in turn are connected to the block 330 and to pixel clock input, horizontal sync input, vertical sync input, DATA_ENABLE, and data input signals, respectively. The timing generator 330 outputs timing signals that operate the flat panel display at the native resolution or fixed resolution. The timing generator 330 is a slave unit to the input timing in that the output horizontal and/or vertical timing is loosely coupled to the input timing.

The circuit 315 converts the output resolution of the flat panel display controller to the fixed flat panel display resolution. The scaler circuit generates timing for its fixed panel resolution while acting as a slave to the input (lower resolution timing) that it receives. The system side flat panel controller may be an independent master for timing generation purposes.

The horizontal and vertical scale factors (H-scale and V-scale respectively) are computed automatically as follows:

$$\text{Horizontal Scale Factor} = \frac{\text{Horizontal Fixed Resolution}}{\text{Active Horizontal Count}}$$

$$\text{Vertical Scale Factor} = \frac{\text{Vertical Fixed Resolution}}{\text{Active Vertical Count}}$$

Figure 4:
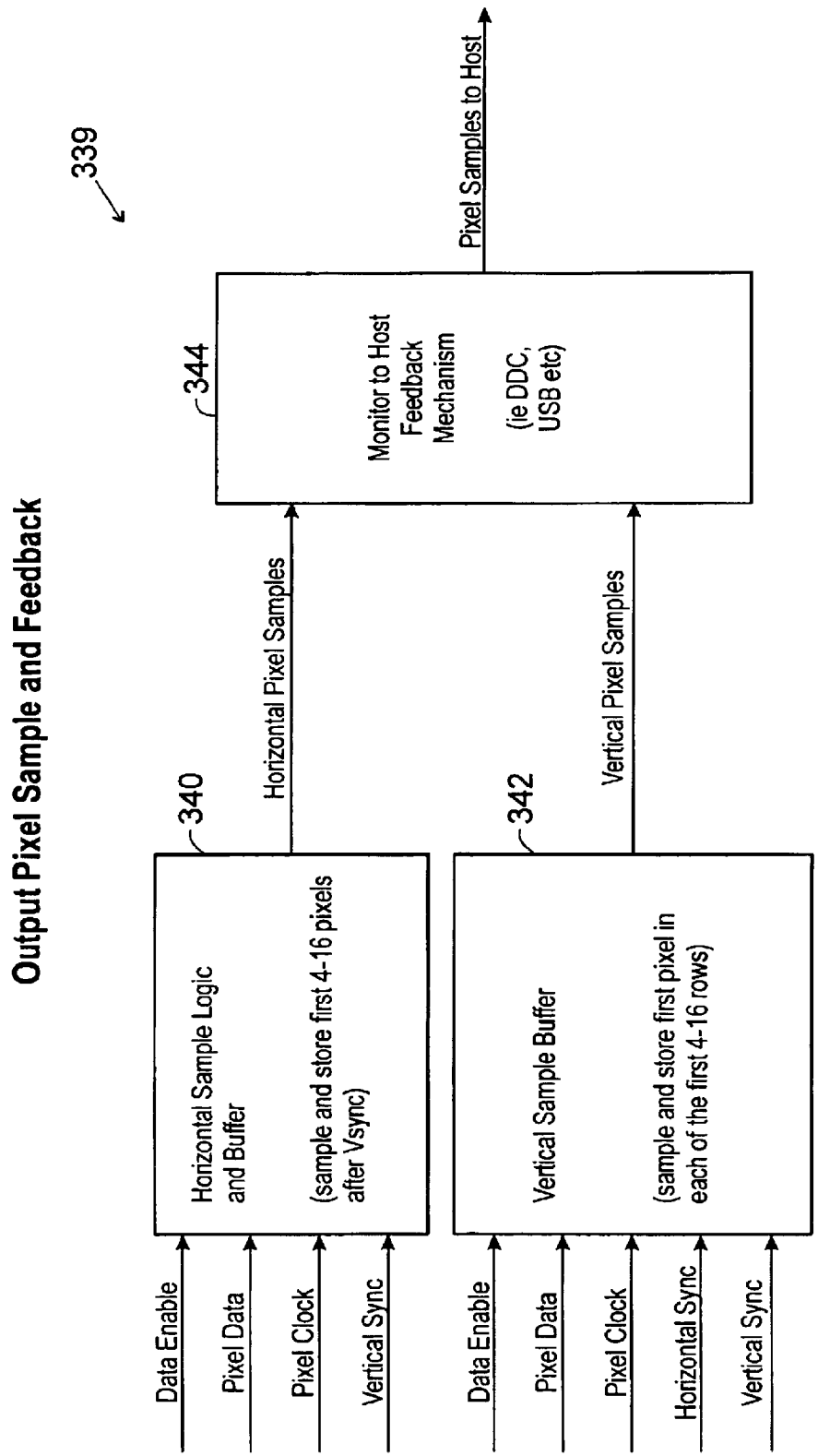
FIG. 4 is a circuit to sample output pixels for feedback and analysis.

The automatic scaler mode detection based on output quality sample analysis is discussed next. Referring now to FIG. 4, a block diagram of a circuit 339 for generating output signal sample and feedback data and is described in detail. First, from the DATA_ENABLE signal, pixel data, pixel clock, and vertical sync signal, a horizontal sample logic and buffer block 340 generates a plurality of horizontal pixel samples. Correspondingly, from the DATA_ENABLE signal, pixel data, pixel clock, horizontal sync and vertical sync signal, a vertical sample buffer 342 generates a plurality of vertical pixel samples. The horizontal and vertical pixel samples are provided to a monitor to host feedback block 344. The output of block 344 is a plurality of pixel samples which are sent to the host computer 300.

The circuit 339 provides the computer 300 with the ability to automatically select a scaler mode when it has scaling capability and when it is combined with a flat panel display monitor which also has the ability to scale its input resolution from various sizes to fit its native resolution and to accommodate a given active display mode. This is done by intercepting and sampling the pixel stream within the display monitor just before the data is sent to the physical pixel array. The circuit 339 collects two samples of about 4–16 pixels each. One sample covers contiguous horizontal locations, and the other covers contiguous vertical locations.

The memory required to store the pixel is relatively small compared to storage elements used for the scaling function itself.

The host system could display one or more test patterns before accumulating the samples. Once accumulated, the samples could be communicated back to the host system via a Digital Display Connector (DDC) or some other display to host communication means such as Universal Serial Bus (USB). The computer 300 then evaluates the samples to determine the quality of the filter which was applied during the image scaling. The computer 300 can then select the different possible combinations between using the system side scaling and/or the display side scaling and evaluate the display quality of each possibility. After determining the highest quality option, the computer 300 is automatically reconfigured to this mode. The user could optionally be given some control over the quality/selection criterion by being offered a selection such as "sharp edges" vs "smooth edges," as shown in FIG. 5.

Figure 5:
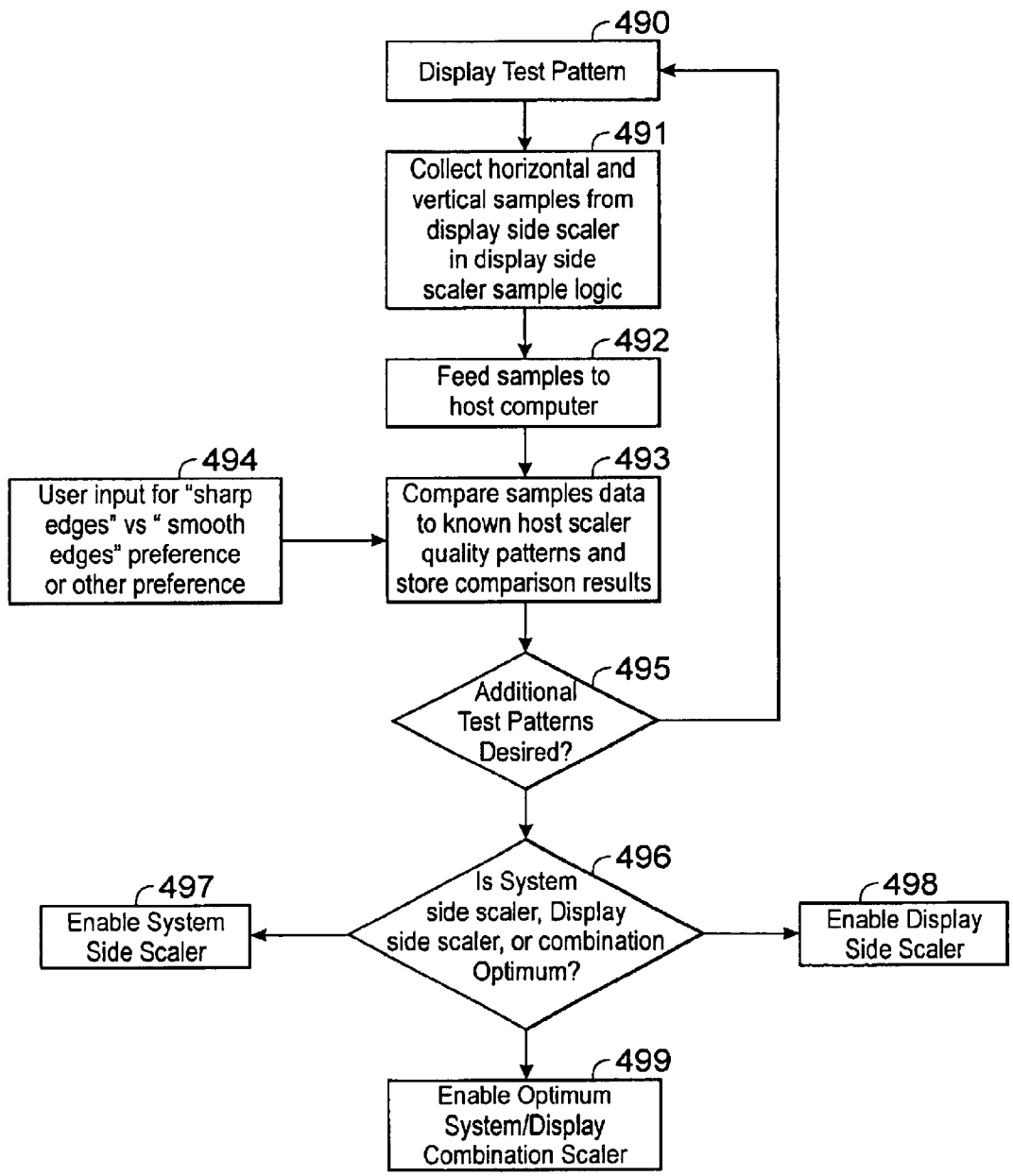
FIG. 5 is a flowchart illustrating a process for performing automatic scaler mode selection.

Turning now to FIG. 5, a process for performing automatic scaler mode selection with the circuit of FIG. 4 is shown. First, a test pattern is displayed (step 490). Next, horizontal and vertical samples from the display side scaler is collected via logic on the display device (step 491). The samples are transmitted to the host computer (step 492). Additionally, a user may also provide inputs to the host computer 300. These inputs include "sharp edge selection" or "smooth edge selection" (step 494). Other user preferences may also be provided to the host computer 300. The inputs from step 492 and 494 are processed by the host computer 300 (step 493) and the comparison of the sample data to known host scaler quality pattern are stored in memory or on disk. In addition to the test pattern displayed in step 490, other patterns may be tested and if so, the process loops from step 495 to step 490 to display the next pattern.

Once all test patterns have been compared to known host scaler quality patterns, the system determines whether the system side scaler, the display side scaler, or a combination of scalers are optimum (step 496). In the event that the system side scaler provides the optimum result, the system side scaler is selected (step 497). Alternatively, in the event that the display side scaler alone provides the optimum result, the display side scaler is enabled (step 498). Further, in the event that a combination of both scalers provide the optimum result, both are enabled (step 499).

Figure 6:
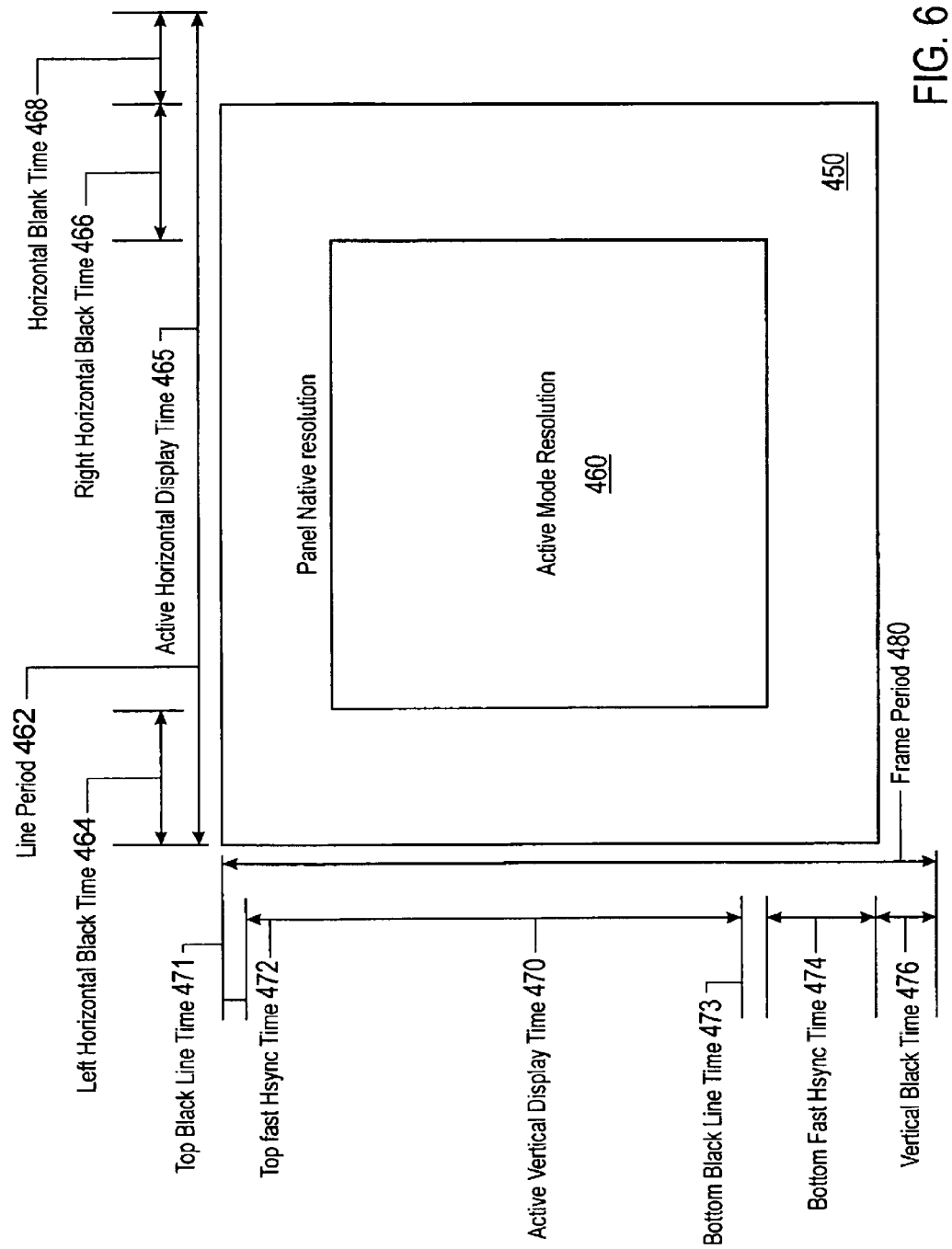
FIG. 6 is a diagram illustrating terminologies associated with bandwidth optimized displayed mode centering.
Figure 7A:
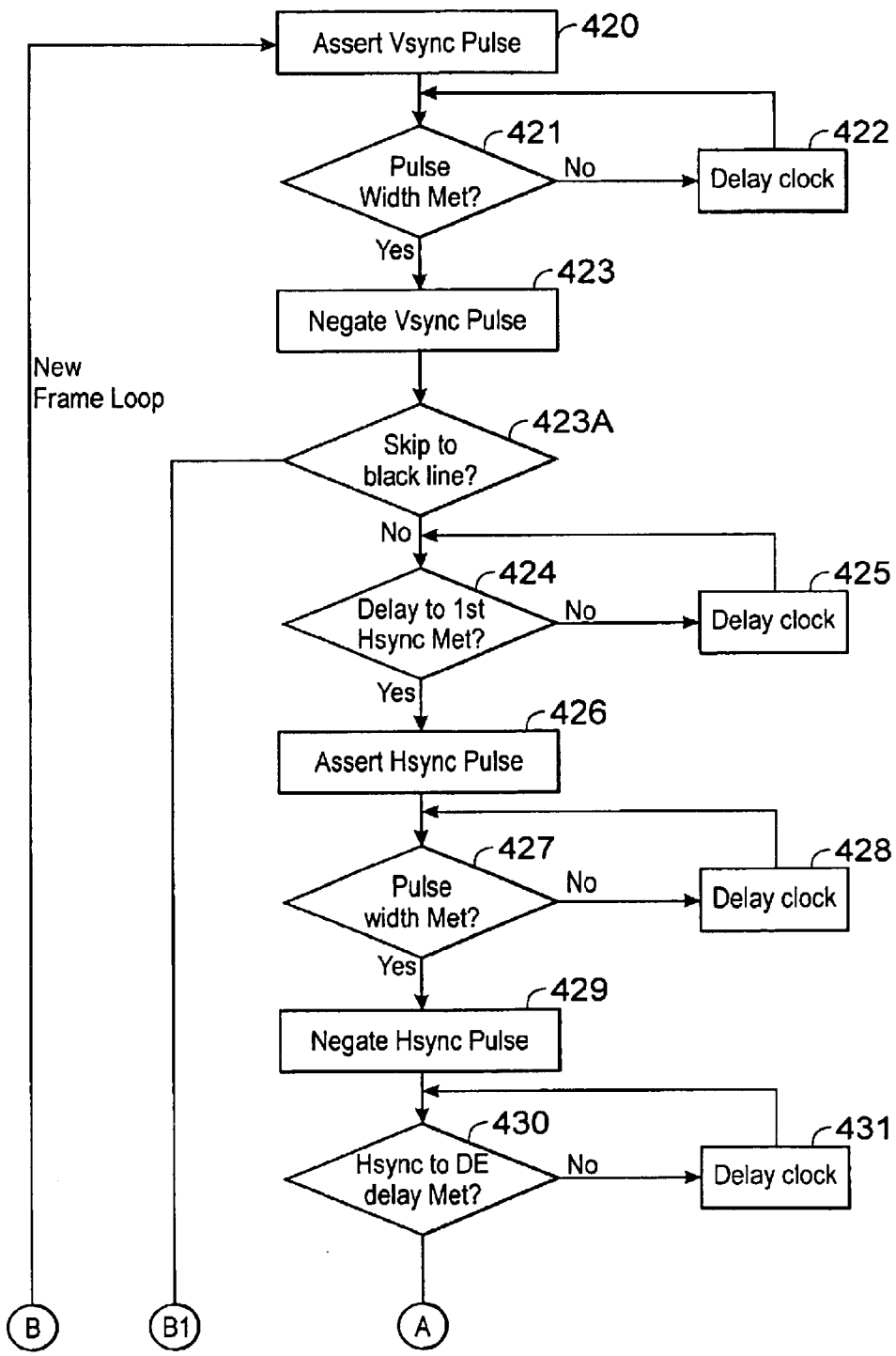
FIGS. 7A, 7B, 7C, 7D and 7E are flowcharts illustrating a process for performing low bandwidth display mode centering.
Figure 7B:
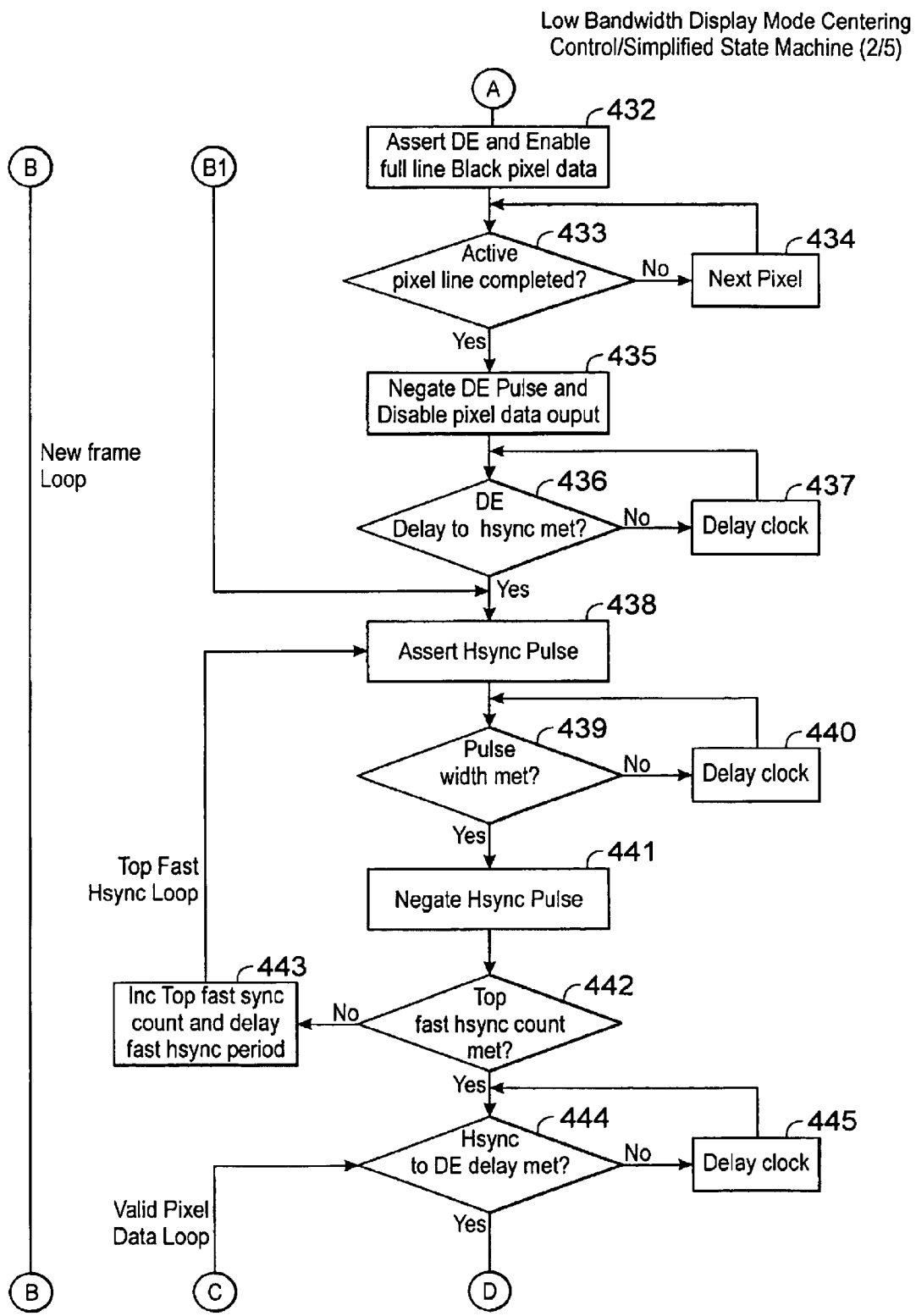
Figure 7C:
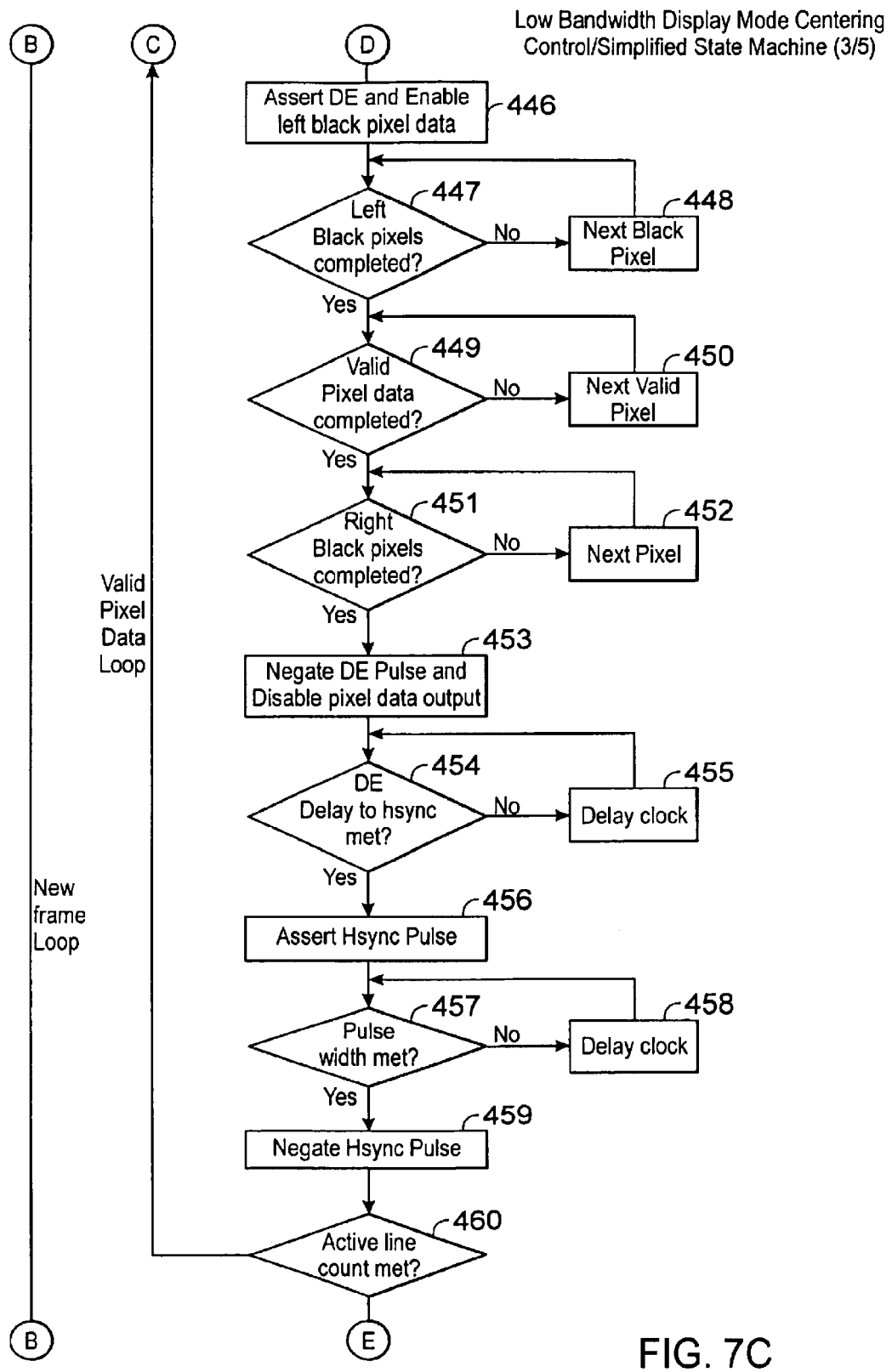
Figure 7D:
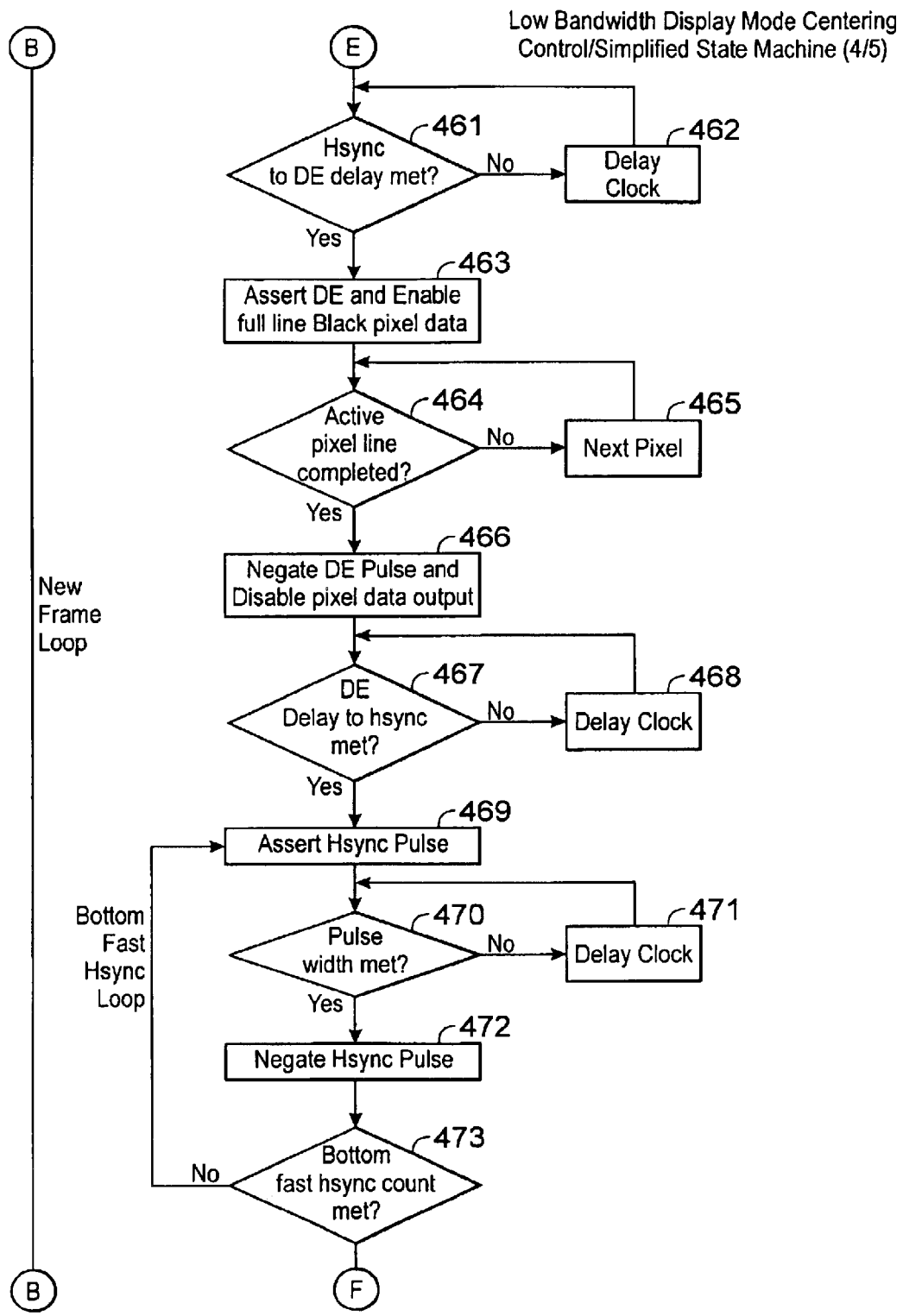
Figure 7E:
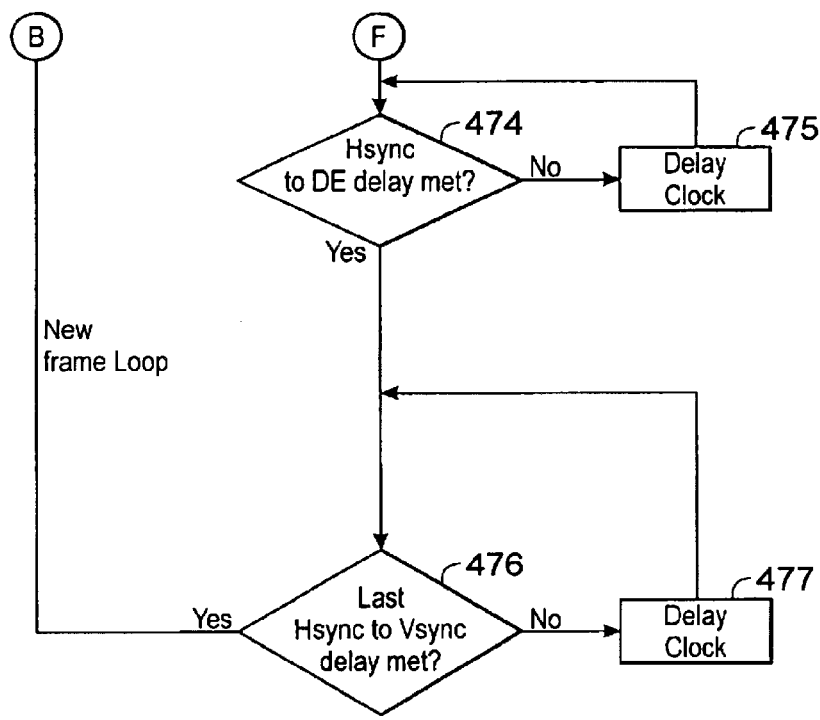

Low bandwidth display mode centering capability is discussed next. FIG. 6 shows a diagram illustrating terminologies associated with a bandwidth optimized display mode. The system has a panel native resolution 450 which is a superset of an active mode resolution 460. The panel native resolution display includes a line period 462. The line period 462 includes a left horizontal blank time 464, an active horizontal display time 465, a right horizontal blank time 466, and a horizontal blank time 468. Correspondingly, a frame period 480 contains a top black line time 471, a top fast horizontal sync time 472, an active vertical display time 470, a bottom black line time 473, a bottom fast horizontal sync time 474, and a vertical blank time 476.

When the maximum output resolution of the host computer is less than the resolution of the flat panel display and the centering option has been selected, the host computer must transmit blank (typically black) pixels for several lines at the top and bottom of the frame. The host must also transmit blank pixels at the start and finish of each line so as to center the active display data in the larger flat panel pixel array. For example, in order for 1024×768 (P1×L1) active pixels from the host to be displayed in the center of a 1280×1024 (P2×L2) pixel panel, P2 P1=1280−1024=256 blank pixels must be added to each line—128 at the start and 128 at the end of each line. Further, L2−L1=1024−768=256 blank lines must be added to each frame—128 at the top and 128 at the bottom of each frame. Normally, the insertion of a blank line entails transmitting 1280 blank pixels, one at a time. Thus, the transmission of 128 blank lines would entail repeating the blank line transmission process 128 times.

FIGS. 7A–7E shows a process for performing low bandwidth display mode centering on a flat panel display controller which minimizes the blank line transmission timing. The flat panel display controller first asserts a horizontal sync pulse during an active vertical display period. The process determines m black lines from the top of the screen to the top of the image and determines n black lines from the bottom of the screen to the bottom of the image. The n and m lines thus form top and bottom borders around which an original image may be centered. A line buffer in the display device which holds data for the line to be displayed is then filled with black values. The process then displays m black lines using a second horizontal sync period at the start of each frame, where the second horizontal sync period is shorter than the first horizontal sync period. Each line of the image is then horizontally centered and displayed, followed by n black lines which are displayed using the second horizontal sync period at the start of each frame. By using the shortened second horizontal sync periods to generate the top and bottom borders, the top and bottom borders are generated quickly. Moreover, the process only needs to fill the line buffer with black data once or twice for the entire centering process. Thereafter, for the rest of the blank lines, the host controller need only transmit the line synchronization pulse. This operation takes substantially less time and effectively reduces the transmission bandwidth requirement.

As shown in FIGS. 7A–7E, the low-bandwidth display mode centering process initially asserts a vertical sync pulse (step 420) and determines whether the minimum required pulse width has been satisfied (step 421). If not, the process waits for a predetermined period (step 422) before rechecking the pulse width duration. Once the required period is satisfied, the vertical sync signal is negated (step 423). The system may also optionally output a black line at the top of the display screen if a programming bit called "Skip Top Black Line" has been cleared in step 423A. Alternatively, if the programming bit of step 423A is set, the process jumps to step 438 via a connector B1.

After processing the optional top black line, a number of top fast horizontal sync signals are provided to the flat screen controller to insert the required number of blank lines at the top to center the original image. The process waits for a predetermined period before asserting a horizontal sync pulse (step 424). If the minimum period is not met, the process waits for a predetermined period (step 425) before rechecking. When the required period between the negation of the vertical sync pulse and the first horizontal sync pulse is met, the process asserts a horizontal sync pulse (step 426) until the required pulse width duration is satisfied (steps 427–428). Upon the completion of the required horizontal sync pulse period, the horizontal sync pulse is negated (step 429).

The process then determines whether the required delay between the horizontal sync signal and the DATA_ENABLE signal has been met (step 430). If not, the process waits in step 431. Once the delay is met, the process proceeds from step 430 to step 432 via an A connector.

In step 432, the process asserts the DATA_ENABLE signal and enables a full line of black pixel data to be copied into a buffer. The process then determines whether the transmission of the active pixel line has been completed (step 433) and if not, processes the next pixel (step 434). Once the transfer of the active pixel line has completed, the process then negates the DATA_ENABLE pulse and disables the pixel output (step 435). Next, the process checks to see if the required period between the DATA_ENABLE signal to the horizontal sync signal (step 436) has been met. If not, the process inserts a delay (step 437) before rechecking.

From step 436, the process then asserts the horizontal sync signal (step 438) for a predetermined period (steps 439–440). At the end of this period, the horizontal sync signal is negated (step 441). The process then determines whether the appropriate number of top fast horizontal sync count has been satisfied (step 442). If not, the top fast horizontal sync count is incremented and a delay for the fast horizontal sync period is asserted (step 443) before the process loops back to step 438 to drive the next top fast horizontal sync signal.

Once the respective number of top fast horizontal sync signals have been generated in step 442 so that the resulting image is vertically centered, the process waits for the required delay between the horizontal sync signals and the DATA_ENABLE signal (steps 444–445). Upon completion of the required period, the process proceeds from step 444 to step 446 via a D connector. The process then asserts the DATA_ENABLE signal and enables left black pixel data to be transferred to a line buffer (step 446). The process then determines whether the left black pixel transfer process has completed operation (step 447) and if not, the next black pixel is transferred (step 448). When all left black pixels have been transferred, the pixels of the current image are then transmitted to the line buffer in steps 449–450. When all pixels associated with the current line of the original image have been transferred, the process then inserts a black segment to the right of the image by filling the rest of the line buffer with a series of right black pixels (steps 451–452). Once the right black segment has been filled, the DATA_ENABLE pulse is negated and pixel data output is disabled (step 453). Next, a predetermined delay is inserted between the DATA_ENABLE pulse and the next horizontal sync pulse (steps 454–455). Upon conclusion of the predetermined delay, the horizontal sync signal is asserted (step 456) and a requisite delay is inserted (steps 457–458) before negating the horizontal sync pulse (step 459). Next, the process determines whether the active line count has been met (step 460) and if not, the process looks back to step 444 via a C connector.

From step 460, in the event that the active line count is met, the process proceeds via an E connector to step 461 where it waits until the required delay between the horizontal sync signal and the DATA_ENABLE signal is met (steps 461–462). The process then asserts the DATA_ENABLE pulse and enables a full line of black pixel data to be transferred (step 463). The process then determines whether the transfer associated with the active pixel line has been completed (step 464) and if not, operates on the next pixel (step 465). Once the transfer completes, the process then negates the DATA_ENABLE pulse and disables pixel data output (step 466). It then waits for the required period between the deassertion of the DATA_ENABLE signal and the next horizontal sync signal (steps 467–468).

A number of bottom black lines are then generated to complete the low-bandwidth centering of the flat panel display. This is done by filling up the line buffer with black color pixels. First, the horizontal sync signal is asserted (step 469) and is maintained for the required pulse duration (steps 470–471) before it is negated (step 472). Next, the process determines whether the bottom fast horizontal sync count has been met (step 473). If not, the process loops back to step 469 to continue generating the bottom fast horizontal sync signals. When all bottom fast horizontal sync signals have been sent, the process proceeds to step 474 via an F connector and waits for the required delay between the horizontal sync signal to the DATA_ENABLE signal (steps 474–475). Once the horizontal sync to DATA_ENABLE delay is satisfied, the process then waits for another timing period between the last horizontal sync signal to the vertical sync signal (steps 476–477) before looping back to step 420 via a B connector to handle the next frame.

In one implementation, the following groups of registers in the display controller are used. Three registers contain start of frame information: Vsync pulse width, Fast Hsync pulse width, Delay from Vsync trailing edge to first Hsync pulse, Skip top black line bit, and Fast Hsync Period. One register is used to hold the top fast Hsync line count information and another register is used to hold the bottom fast Hsync line count information. Further, a number of registers are used to hold information regarding the active display time, including active Hsync pulse width, active line Hsync trailing edge to DATA_ENABLE delay; active line DATA_ENABLE trailing edge to Hsync delay Active Hsync Line count; active line full pixel count; active line valid pixel count; left black pixel count; and right black pixel count. Additionally, a register is used to hold information regarding the delay from last bottom fast Hsync trailing edge to Vsync.

Figure 8:
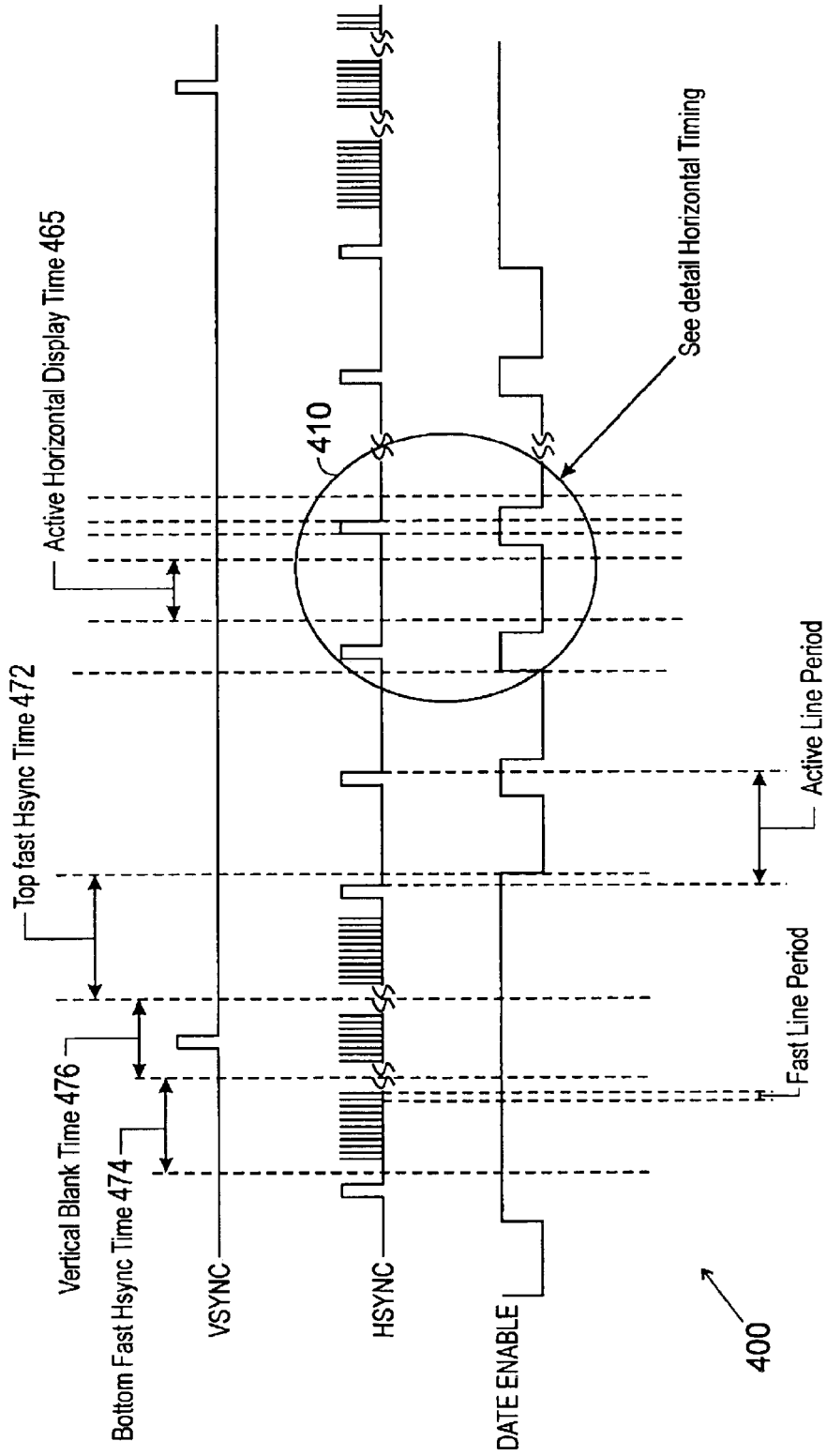
FIG. 8 is a diagram illustrating bandwidth optimized displayed mode centering timing.
Figure 9A:
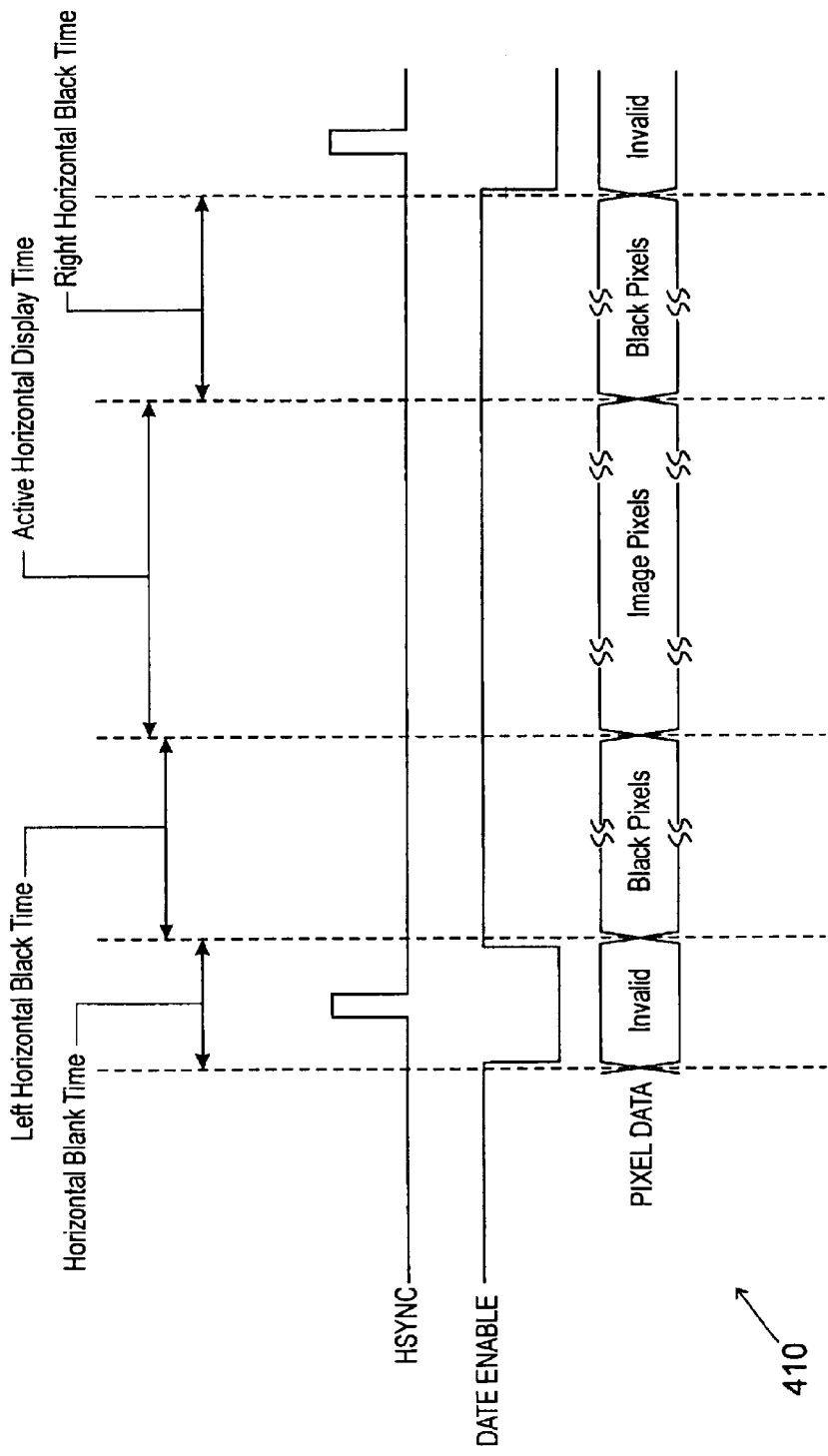
FIG. 9A is a detailed timing diagram illustrating horizontal timing during active vertical display.
Figure 9B:
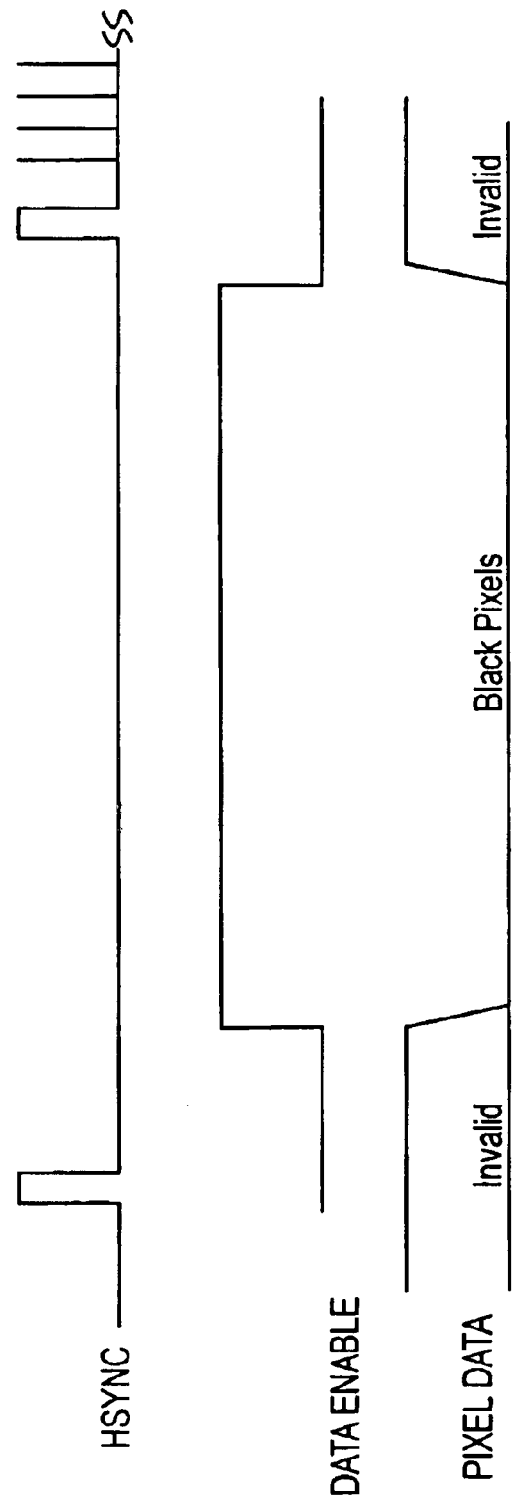
FIG. 9B is a detailed timing diagram illustrating black line timing during active vertical display.

FIG. 8 and FIGS. 9A–B show timing diagrams 400 and 410 associated with various timing periods for the bandwidth optimized display mode. The horizontal timing diagram 410 of the active vertical display operation of FIG. 8 is shown in more detail in FIG. 9A, while the black timing diagram 411 is shown in more detail in FIG. 9B.

FIG. 9A illustrates the timing associated with the centering of lines of the original image after the top borders have been generated. A plurality of black pixels are generated for display during the left horizonal black time, as shown in detail in FIG. 9B. The black pixels are then followed by a series of pixels associated with the original image. This is done during the active horizontal display time. At the last pixel of the original image, a series of black pixels are generated for display during the right horizontal black time, as shown in detail in FIG. 9B.

The software control of the dual video scalers is discussed next. The software determines all possible scaler modes supported by the scalers in the display controller and the display device, respectively. The software control also allows the user to select the highest quality display mode. The addition of video centering/scaling to the flat panel display creates the potential for generating certain output modes (resolutions) which could be generated using either the system flat panel controllers, scaling logic or the scaling logic in the flat panel display itself. Since the quality tradeoffs of the two different possible scaler selections are likely to be different, the system provides a method for user selection between the two or more possibilities. This software control assesses the level of centering and/or scaling logic in the system flat panel controller as well as in the flat panel monitor and enables the user to select from the available options. Optionally, the software could make some intelligent decisions to constrain the choices to limit the complexity for the user.

The software may be contained in the system graphics subsystem BIOS, device drivers or both. Several parameters are tracked by the software which determine how it will control the subsystem. The first set of parameters are known to the software since they are provided by the display controller itself and may be hard coded for a particular implementation. The first set of parameters may provide data on the display controller's maximum output frequency (limits highest resolution), minimum output frequency (limits lowest resolution), centering capability, and scaling capability. The software also uses parameters which vary and are under control of the user and/or the graphics subsystem software, including the active mode resolution of the display device. Additionally, the software uses parameters which are communicated from the flat panel display (typically via DDC/EDID or similar means). These parameters include the display device's maximum resolution, minimum resolution, native (fixed) resolution, and centering capability.

The software evaluates these parameters and determines which of the following "available options" flags below can be set. These flags include system side centering, display side centering, system side scaling at 640×480, system side scaling at 800×600, system side scaling at 1024×768 (resolutions below 1024×768 supported by system), system side scaling at 1280×1024, system side scaling at 1600×1200, display side scaling at 640×480, display side scaling at 800×600, display side scaling at 1024×768 (resolutions below 1024×768 supported by system), display side scaling at 1280×1024, and display side scaling at 1600×1200.

The system side scaling factors describe the resolution of the output of the system flat panel controller. If the chosen system side output mode is different than the active display mode, then the system side scaler is active. If system side output mode is different than the native flat panel display resolution, then the flat panel monitor scaler is active.

The "system side centering" and "display side centering" flags indicate that a lower resolution image can be centered on a high resolution display without any scaling applied. The user would not know the difference if the centering operation were performed by the system flat panel controller or by logic on the flat panel monitor. Therefore, only a single option "Center Mode" needs to be presented to the user. The system should simply choose to default to one or the other when selected if both options are present. If the system side scaler can't support the flat panel native resolution, a proper centering could only be supported on the monitor side. Also, if the system side cannot support the native panel resolution of the flat panel monitor and only the system has a centering capability, a combination of centering from the system controller and scaling in the monitor may be employed. This would result an image being centered on the display but also upscaled.

The system scale resolution could potentially be in between the active resolution and the native panel resolution, meaning that both the system and monitor scalers are being used for a portion of the scaling process. Using both scaler units to achieve the target active resolution might be desirable if the system scaler was a higher quality scaler but had a limit below the panels native resolution. Assuming the monitor had a lower quality scaler, than the optimum mode would probably be to use the system side scaler up to it's maximum resolution, and than use the monitor side scaler to finish the upscaling process.

Once the "available option" flags have been determined, the software can present the user with all options or it can present the user with simplified set of options. FIG. 13 shows a sample user interface for selecting the mode of operation for the scaler. The software presents the user with all options available and disables any options not available by graying out the selection such that available options would not be grayed out. Further, the user may select an option by checking a radio button or by positioning a slider bar on the interface. The interface is discussed in more detail in FIGS. 13–17 below.

Figure 10:
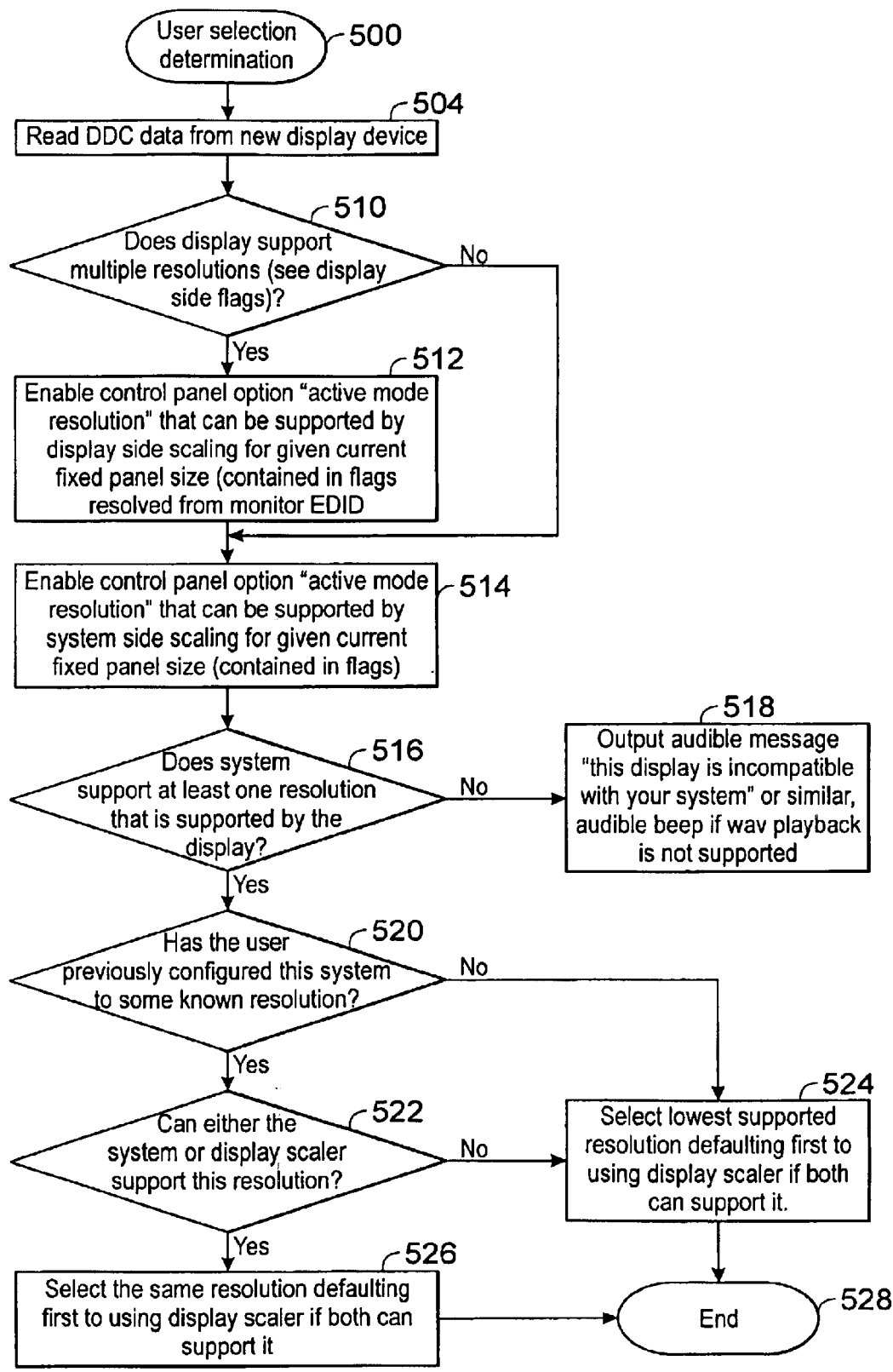
FIG. 10 is a flowchart illustrating a process for identifying and enabling user options during initialization or upon detecting a new display device in the computer system.

Referring now to FIG. 10, a process 500 for identifying and enabling user options during a system initialization or upon detecting a new display device is shown. First, the process 500 reads data from the new display device (step 504). The data may be retrieved using the digital display connector (DDC) port. Next, the process 500 checks whether the display supports multiple resolutions (step 510). If so, the process 500 enables the supported resolutions in the user interface (step 512). After step 512, or in the event that the display does not support multiple resolution in step 510, the process 500 enables the active mode resolution that can be supported by the display controller side scaler for a given fixed panel size (step 514).

Next, the process 500 determines whether the system supports at least one resolution that is also supported by the display device (step 516). If not, the process 500 outputs an audio message and indicates that the display is incompatible with the system (step 518). From step 516, in the event that the system supports at least one resolution on the display device, the process 500 then determines whether the user has previously configured the system to a predetermined resolution (step 520). If so, the process 500 further determines whether either the system controller or display device controller supports the predetermined resolution (step 522). From step 520 or step 522, in the event of a negative determination, the process 500 selects the lowest supported resolution and defaults first to using the display scaler if both the system controller and the display device can support the resolution (step 524). Alternatively, from step 522 in the event that the predetermined resolution is supported by either the system or the display side scaler, the process 500 selects the same resolution and defaults first to using the display side scaler (step 526). From step 524, step 526, the process 500 exits (step 528).

Figure 11:
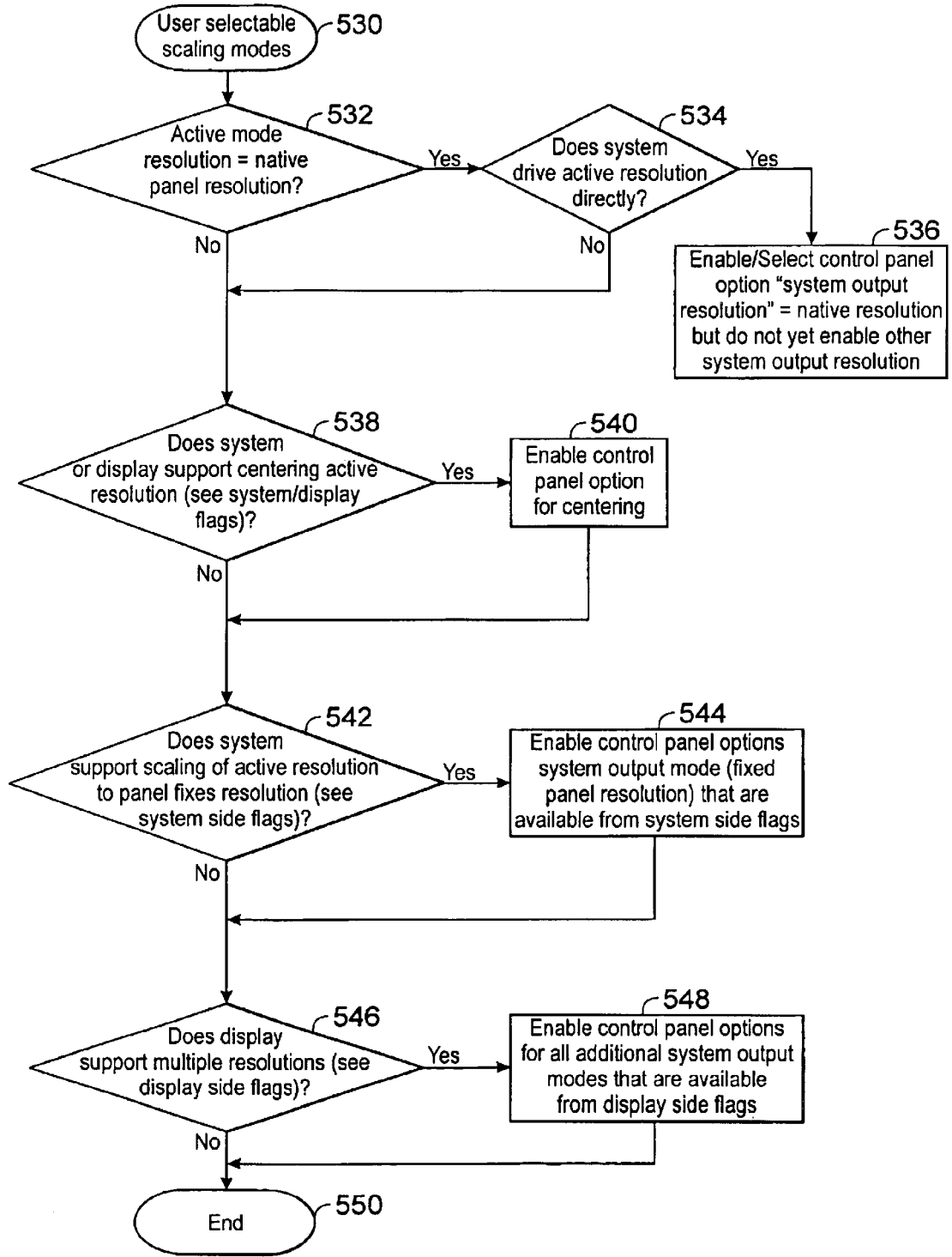
FIG. 11 is a flowchart illustrating a process for updating available options for scaling and centering when the user changes the active resolution of the display device.

Turning now to FIG. 11, a process 530 for updating the user interface available options for scaling and centering when a user changes the active resolution is shown. The process first determines whether the active mode resolution is equal to the native panel resolution (step 532). If so, the process 530 further determines whether the system can directly drive the active resolution (step 534). If so, the process 530 then enables or selects the supported system output resolution which is equal to the native panel resolution (step 536) without enabling other system output resolutions. From step 536, the process 530 exits (step 550).

From step 532 or step 534, in the event that the determination is negative, the process 530 checks whether the system or display supports centering active resolution (step 538), and if so, enables the control panel option for centering (step 540). Next, the process 530 further checks whether the system supports scaling of the active resolution to the panel fixed resolution (step 532). If so, the process in 530 enables the control panel options system output mode that are available from the system side flags (step 544). Next, the process 530 determines whether the display supports multiple resolution, as referenced by the display side flags (step 546). If so, the process 530 enables the control panel options for all additional system output modes available from the display side flags (step 540). From step 546 or 548, the process 530 exits (step 550).

A pseudocode for the software method for determining the user selections available is shown below.

```
If (the system has been rebooted or a new display has been detected)
{
    read the monitor digital data to establish the new available display
    mode options
    If (display supports multiple resolutions)
    {
        store the available display supported resolutions and combine these
        with the previously known system supported resolutions for the
        current fixed panel size
    }
    If (there is at least one supportable mode available)
    {
        select the previously selected mode or the lowest resolution
        supported mode if none was previously selected
    }
    Else
    {
        output an audible message indicating incompatibility. A voice
        message is preferred but a sequence of 2 or 3 beeps can be used
        if voice audio is not available
    }
}
If (the display control user interface application has been opened)
{
    If (the active mode resolution = the native panel resolution
        and the system can drive this resolution)
    {drive the active resolution directly then do so since no
    scaling is required }
    Else If (system or display can support centering)
            {enable user interface option for centering}
    If(system supports scaling active resolution to fixed
    panel resolution)
            {enable control panel options for supported system
            output modes}
    If(the display supports multiple resolutions)
            {enable any additional control panel options for
            supported system output modes}
}
If (user applies a change to the display control panel settings)
{
    Store the new settings as a user preference for the current active
    mode and program the system output per the new selection
}
If (an application changes active resolution)
{
    If (previously available setting exists for this active resolution)
    {
        use the stored user preference and program the system
        output per the new selection
    }
    Else
    {
        use display scaler as first default (active mode resolution =
            system output resolution)
        if supported or use system scaler (active mode resolution =
            native panel resolution) and if display scaler can't
            support.
                Program the system output per the new selection
    }
}
```

Figure 12:
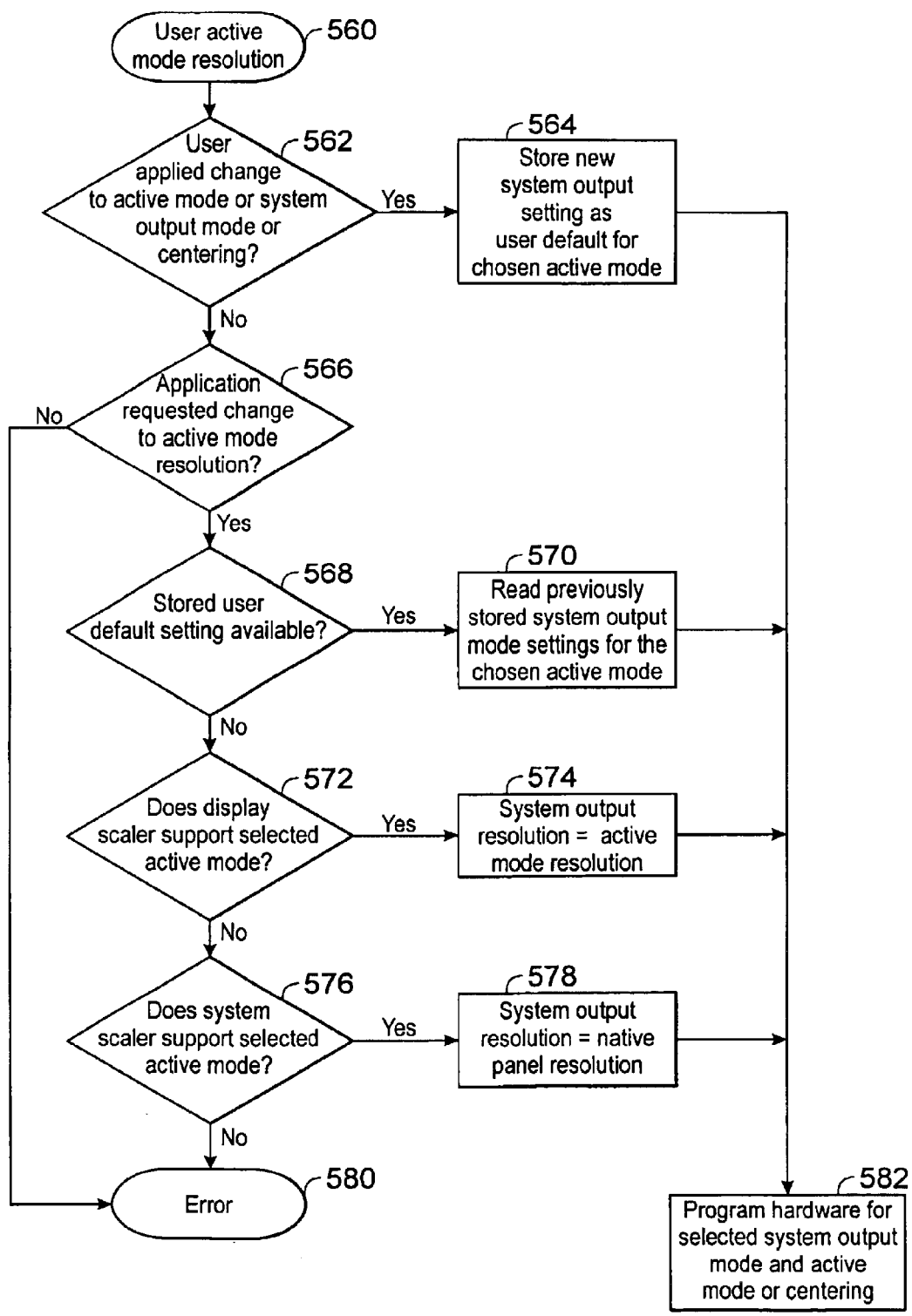
FIG. 12 is a flowchart illustrating a new active mode selection process.

Turning now to FIG. 12, a process 560 for applying a change to the active mode, the system output mode, or centering is shown. Initially, the process check whether the user has applied a change to the active mode or the system output mode (step 562). If so, the process 560 stores the new system output setting as a user default chosen for the active mode (step 564) and then programs the hardware for the selected system output mode and the active mode (step 582). From step 562, in the event that the user has not applied a change, the process then determines whether the application software has requested a change to the native mode resolution (step 566). If not, the process indicates an error (step 580). Alternatively, if the application software has requested a change, the process 560 then checks whether the store user default setting is available (step 568). If so, the process 560 reads the previously stored system output mode setting for the chosen active mode (step 570) and proceeds to step 582 to program the hardware. From step 568, in the event that there is no stored user default setting, the process checks whether the displayed scaler supports the selected active mode (step 572). If so, the process 560 sets the system output resolution to be the active mode resolution (step 574) before proceeding to step 582. Alternatively, from step 572, the process then checks whether the system scaler supports the selected active mode (step 576). If not, the process 560 indicates an error (step 580). Otherwise, from step 576, the process 560 sets the system output resolution to the native panel resolution (step 578) before proceeding to step 582 to program the hardware for the selected system output mode and active mode.

The example control panels below assume that the system is capable of outputting a maximum of 1280×1024 resolution. This example simplifies the selection for the user slightly by only providing one option for centering. This means that the software would use whichever centering mode it determines as optimum when any limitations exist or simply default to one or the other when all things are equal. The software presents the user with all options available and disabling any options not available. As the user changes the active resolution selection, the software updates the system output resolution availability by "graying out" modes that can not be selected.

Figure 14:
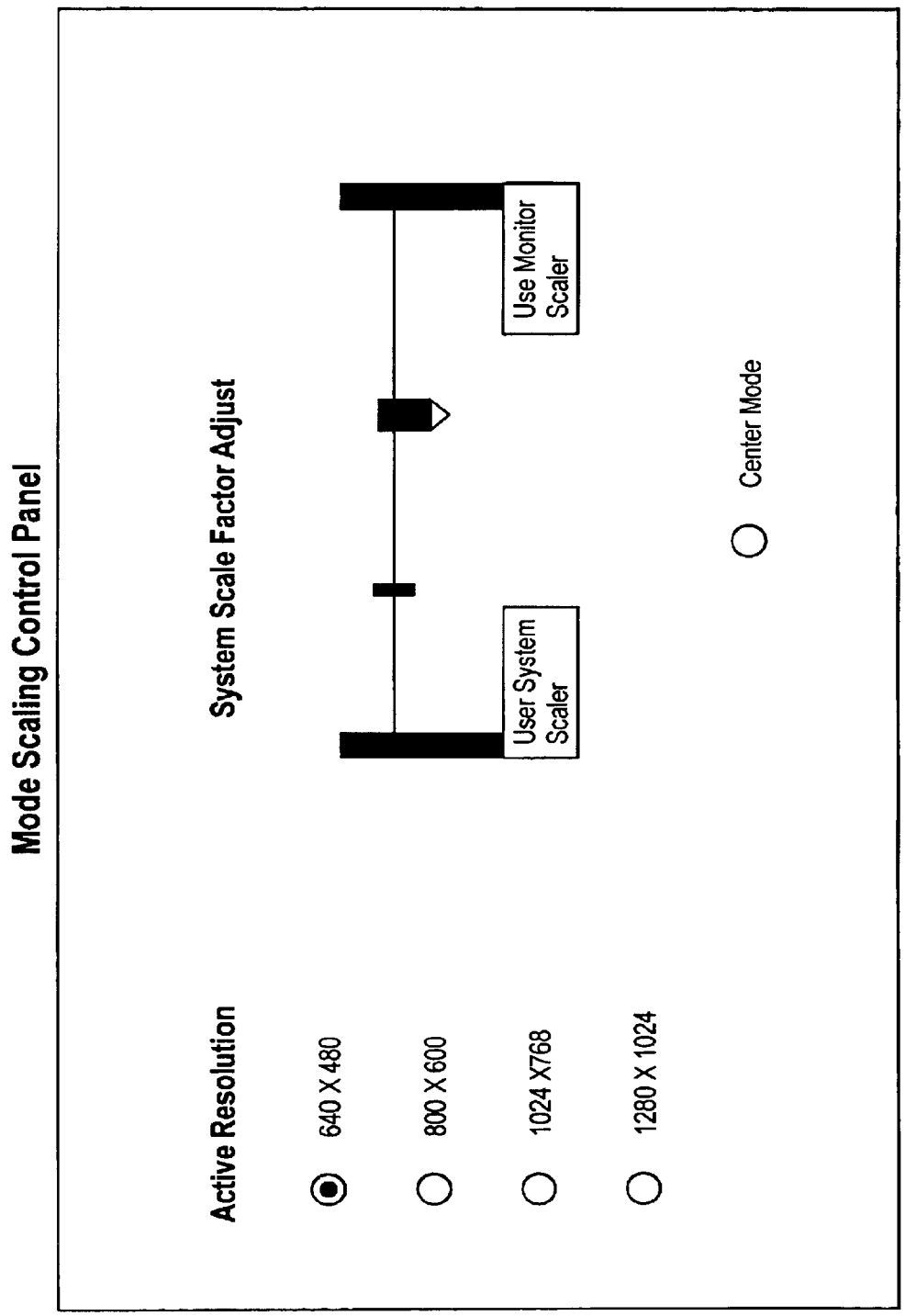
FIG. 14 is a diagram showing a second mode scaling control panel.

The example control panel of FIG. 13 assumes that the system is capable of outputting a maximum of 1280×1024 resolution. However, if only the display could do scaling, then only the active mode resolution needs to be selected by the user. If the scaling is in the system, then the system scale resolution would be locked to the fixed panel resolution with others grayed out or hidden. FIG. 14 is similar in concept to FIG. 13, but is an alternate user interface which constrains the user to valid options by limiting the display of one or more radio buttons or the range of a slider bar.

Figure 15:
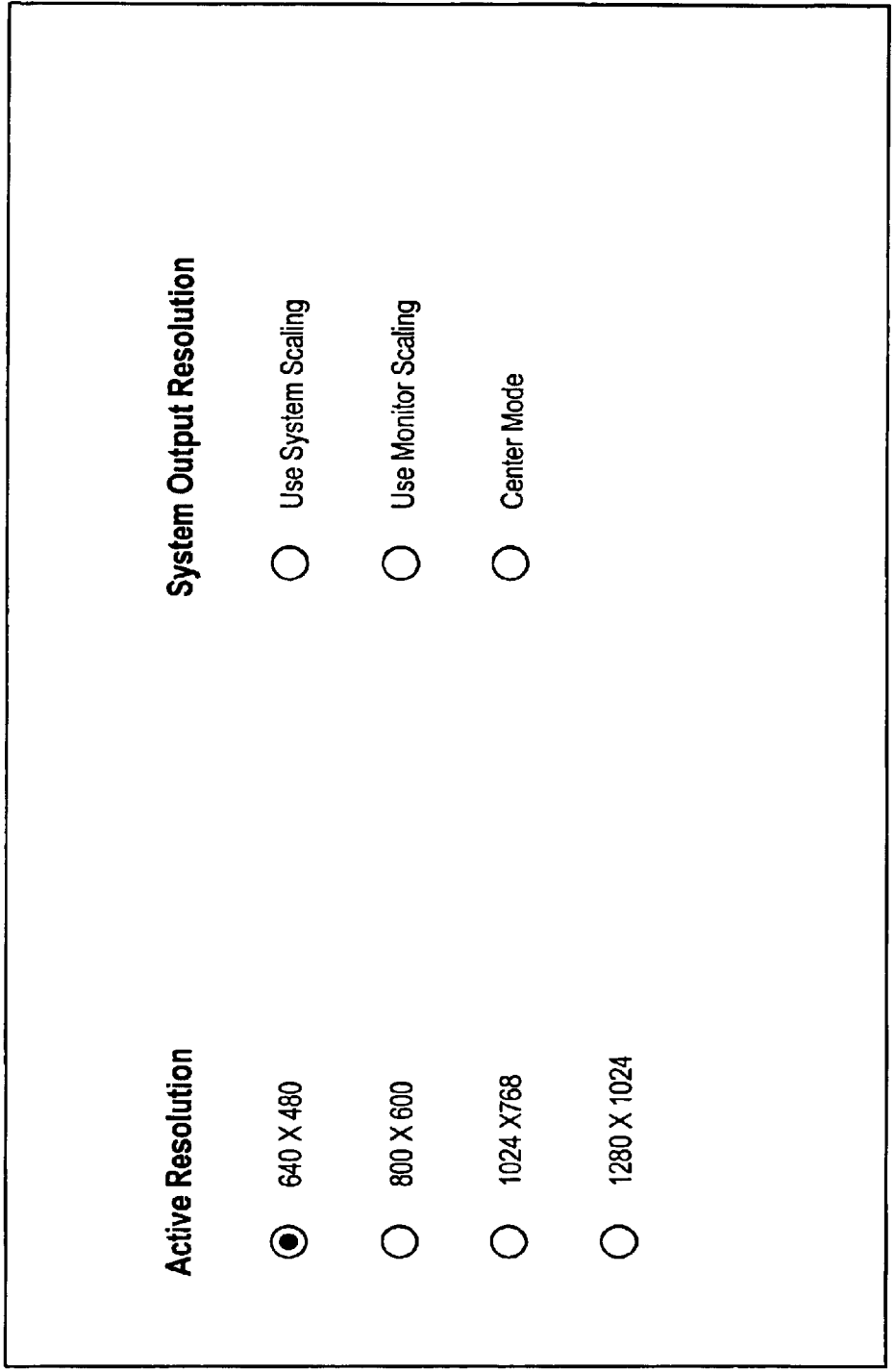
FIG. 15 is a diagram showing a third mode scaling control panel.

FIG. 15 shows a further simplified view to the user with only two options for scaling. Here, the software resolves any limitations between the two options and chooses the closes match to the user selection. The simplified control panel of FIG. 15 may be presented first, with a more detailed user interface available via an "advanced" control panel. The user interface of FIG. 15 thus supports the use of a combination of both scalers to produce a final image.

FIGS. 16 and 17 show example scenarios with different assumptions on the system and display and a brief description of how the software handles each case. FIG. 16 shows an example of a system with an XGA display and wherein only the display controller can perform scaling. In this example, the system is capable of outputting max frequency of 65 MHz (resolution of 1024×768 at 60 Hz), the active mode is 640×480 at 60 Hz resolution, the system can do centering or scaling using pixel/line replication, and the monitor can not do any scaling and accepts only 1024×768 resolution. In this example, the possible modes are (1) the 640×480 resolution is scaled up to 1024×768 by the system side controller; or (2) the 640×480 resolution is centered on the 1024×768 resolution by the system side controller. FIG. 16 thus shows that these two options as being enabled (shown in bold).

FIG. 17 shows another example for a system with an SXGA display. In this example, the system is capable of outputting a maximum resolution of 1024×768 at 60 Hz and the active mode is at 640×480 at 60 Hz resolution. Further, the system can do centering or scaling using high quality scaling, and the monitor can support any resolution from 640×400 to 1280×1024 and can provide pixel/line replication based scaling, but can not do any centering. In this example, since the display device can scale up to 1280× 1024, the system output resolution can be varied between 640×480 up to 1280×1024 for displaying the 640×480 active resolution. Since the system does high quality scaling, this is most likely the preferred scaler to use. If the user selects the system output resolution to be 1280×1024, the system scaler would be engaged. If the user selects the system output to be 640×480, the display scaler would be engaged. Alternatively, if the user selects an in-between resolution, both scalers would be engaged.

In another example where the system is capable of outputting at a maximum frequency of 65 MHz (resolution of 1024×768 at 60 Hz), the active mode is 640×480 at 60 Hz resolution, the system can do centering or scaling, and the display device cannot scale and accepts only 1280×1024 resolution, the display is incompatible with the system. The system would output an error message such as an audible message to denote that the display is not compatible with the system or, alternatively, beep two or three times if voice audio is not available in the system.

Figure 18:
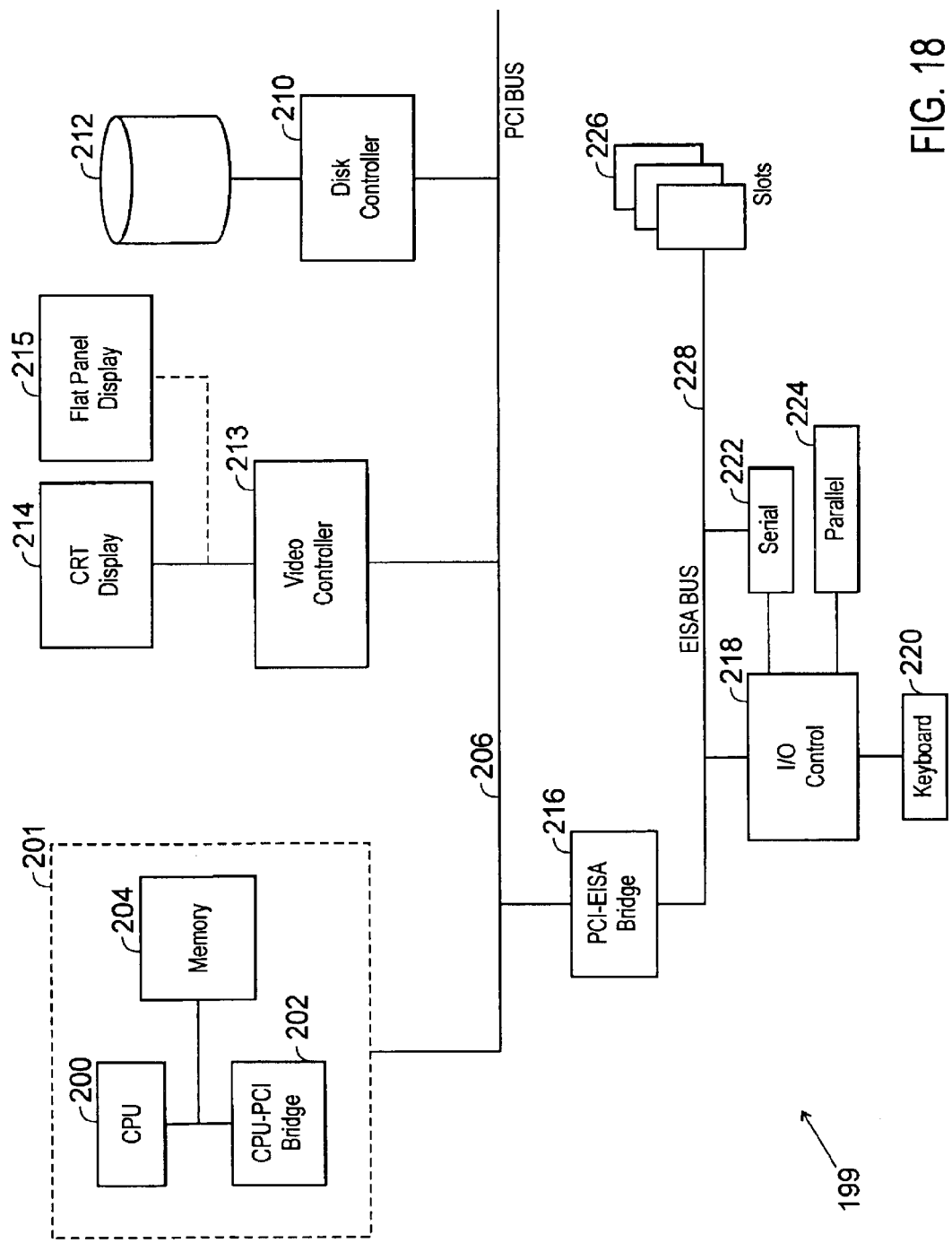
FIG. 18 is a block diagram of a computer system.
Figure 6:
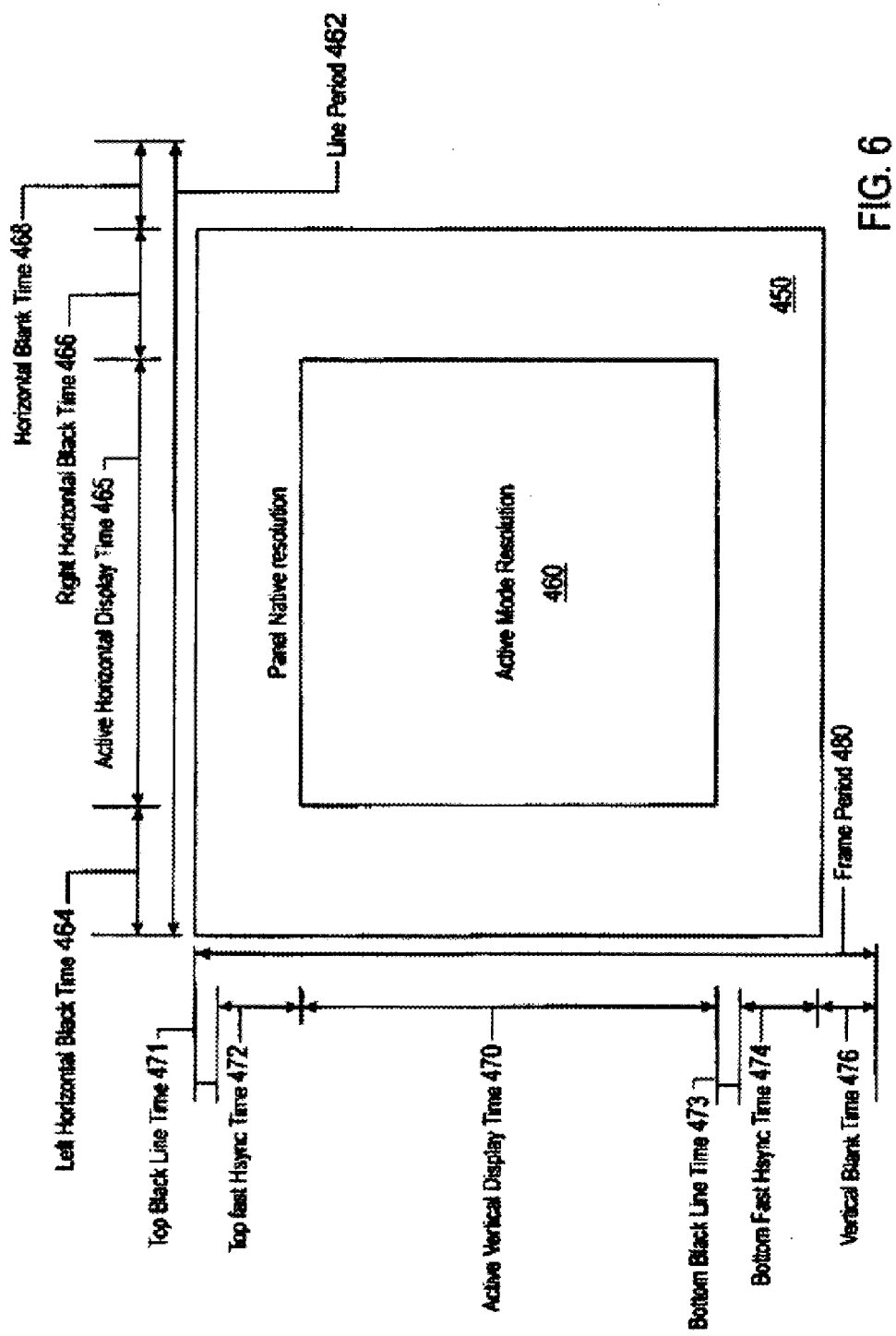

Referring to FIG. 18, a computer system 199 is illustrated. The system 199 includes a central processing unit (CPU) 200 connected by a CPU-PCI bridge 202 to a Peripheral Component Interconnect (PCI) bus 206. A main memory 204 is connected to the CPU 200 and CPU-PCI bridge 202. A mass storage device 212, in the form of hard disk drives, for example, is connected to a SCSI controller 210 which in turn connected to the PCI bus 206. The CPU 200 also drives a video controller 213, which in turn is connected to either a CRT display 214 or an optional LCD flat panel display 215.

An expansion bus 228, such as the Extended Industry Standard Architecture (EISA) or the Industry Standard Architecture (ISA) bus, is connected to the PCI bus 206 through a PCI-expansion bus bridge 216. The expansion bus 228 is connected to an input/output (I/O) controller 218, which provides interface ports to a keyboard 220, a pointer device (such as a mouse), and a serial port 222 and a parallel port 224. Expansion slots 226 are connected to the expansion bus 228 to provide further expansion capabilities.

The system automatically engages a video scaler circuit with the correct scaling factor based on automatic detection of a mode that is not equal to the native flat panel display resolution. The system also enables the manual selection of the highest quality scaler of two or more potential scaler modes when video scalers in the controller and in the monitor may have some overlapping capabilities. Modes include choosing between the two scalers or potentially using a combination of both scalers. Moreover, the system automatically selects the highest quality scaler (or combination of scalers) when a scaler device exists in both a system and a digital flat panel display device. Further, the system positions (typically by centering) a display resolution on a display device of higher resolution while minimizing the bandwidth required to do so. These capabilities allow different display resolutions to be supported and configured with the same computer. Additionally, different quality tradeoffs are available as options to the user.

The specific resolutions used herein are standard resolutions and their resolutions could be added or deleted as required for any specific implementation. Further, the control panel user interface examples shown above are only samples of possible ways to give the user access to the scaler resources in the system and the display. The specific implementation will depend on the expected capability of the target users. For unsophisticated user, a simplified version like the one above could be user possibly providing access to the more complete version via an "advanced" option area of the display control panel.

Other embodiments are also within the scope of the following claims.

What is claimed is:

1. A method for automatic mode detection and scaler control for a display device digitally coupled to a display controller, the display controller having a variable active horizontal resolution and a variable active vertical resolution, the display device having a fixed horizontal resolution and a fixed vertical resolution, comprising:

determining the variable active horizontal resolution of the display controller by counting a pixel clock;

determining the variable active vertical resolution of the display controller by counting active horizontal lines between vertical sync pulses; and scaling the output of the display controller, correlative to the determined variable active horizontal resolution and the determined variable active vertical resolution, to match the fixed horizontal resolution and the fixed vertical resolution of the display device.

2. The method of claim 1, wherein counting of the pixel clock is driven by a valid pixel signal.

3. The method of claim 2, wherein the valid pixel signal is DATA_ENABLE.

4. The method of claim 1, wherein the variable active horizontal lines are determined by counting a horizontal sync pulse qualified with DATA_ENABLE between vertical sync pulses.

5. The method of claim 1, wherein the variable active horizontal lines are determined by counting DATA_ENABLE between vertical sync pulses.

6. The method of claim 1, further comprising assigning display device horizontal and vertical resolutions from a panel size decoder.

7. The method of claim 1, wherein scaling the output of the display controller to the fixed horizontal resolution of the display device comprises dividing the fixed horizontal resolution of the display device by the determined variable active horizontal resolution.

8. The method of claim 1, wherein scaling the output of the display controller to the fixed vertical resolution of the display device comprises dividing the fixed vertical resolution of the display device by the determined variable active vertical resolution.

9. An apparatus to perform mode detection and scaler control in a system with a display controller and a display device, the display device having a scaler circuit for receiving incoming signal resolution and scaling outgoing signal to a display device horizontal resolution and a display device vertical resolution, comprising:

a horizontal counter coupled to the display controller output, the horizontal counter determining an active horizontal resolution by counting a pixel clock;

a vertical counter coupled to the display controller output, the vertical counter determining an active vertical resolution by counting active horizontal lines between vertical sync pulses;

a panel size decoder for receiving panel size selection from a user, the panel size decoder configured to provide output signals based on the panel size selection, the output signals representative of the display device horizontal resolution and the display device vertical resolution; and a control circuit coupled to the horizontal counter, the vertical counter, and the panel size decoder, the control circuit scaling the output of the display controller by a horizontal scale factor and a vertical scale factor to match the horizontal resolution and the vertical resolution, respectively, of the display device if the active horizontal resolution and the active vertical resolution differ from the respective display device horizontal and vertical resolutions.

10. The apparatus of claim 9, wherein counting of the pixel clock is driven by a valid pixel signal.

11. The apparatus of claim 10, wherein the valid pixel signal is DATA_ENABLE.

12. The apparatus of claim 9, wherein the variable active horizontal lines are determined by counting a horizontal sync pulse qualified with DATA_ENABLE between vertical sync pulses.

13. The apparatus of claim 9, wherein the variable active horizontal lines are determined by counting DATA_ENABLE between vertical sync pulses.

14. The apparatus of claim 9, wherein the horizontal scale factor is determined by dividing the display device horizontal resolution by the determined horizontal resolution.

15. The apparatus of claim 9, wherein the vertical scale factor is determined by dividing the display device vertical resolution by the determined vertical resolution.

16. A computer system, comprising:
a processor;
a data storage device coupled to the processor;
a display controller coupled processor;
a display device coupled to the processor, the display device having a scaler circuit for receiving incoming signal resolution and scaling outgoing signal to a display device horizontal resolution and a display device vertical resolution; and
an apparatus to perform mode detection and scaler control coupled to the processor, comprising:
a horizontal counter coupled to the display controller output, the horizontal counter determining an active horizontal resolution by counting a pixel clock;
a vertical counter coupled to the display controller output, the vertical counter determining an active vertical resolution by counting active horizontal lines between vertical sync pulses;
a panel size decoder for receiving panel size selection from a user, the panel size decoder configured to provide output signals based on the panel size selection, the output signals representative of the display device horizontal resolution and the display device vertical resolution; and
a control circuit coupled to the horizontal counter, the vertical counter, and the panel size decoder, the control circuit scaling the output of the display controller by a horizontal scale factor and a vertical scale factor to match the horizontal resolution and vertical resolution, respectively, of the display device if the active horizontal resolution and the active vertical resolution differ from the respective display device horizontal and vertical resolutions.

17. The system of claim 16, wherein counting of the pixel clock is driven by a valid pixel signal.

18. The system of claim 17, wherein the valid pixel signal is DATA_ENABLE.

19. The system of claim 16, wherein the variable active horizontal lines are determined by counting a horizontal sync pulse qualified with DATA_ENABLE between vertical sync pulses.

20. The system of claim 16, wherein the variable active horizontal lines are determined by counting DATA_ENABLE between vertical sync pulses.

21. The system of claim 16, wherein the horizontal scale factor is determined by dividing the display device horizontal resolution by the determined horizontal resolution.

22. The system of claim 16, wherein the vertical scale factor is determined by dividing the display device vertical resolution by the determined vertical resolution.

23. A method for automatic mode detection and scaler control for a display device digitally coupled to a display controller, the display controller having a variable active horizontal resolution and a variable active vertical resolution, the display device having a fixed horizontal resolution and a fixed vertical resolution, the method comprising the acts of:
counting valid pixels between horizontal sync pulses;
determining the variable active horizontal resolution of the display controller based on the act of counting valid pixels;
counting active horizontal lines between vertical sync pulses;
determining the variable active vertical resolution of the display controller based on the act of counting active horizontal lines; and
scaling the output of the display controller, correlative to the determined variable active horizontal resolution and the determined variable active vertical resolution, to match the fixed horizontal resolution and the fixed vertical resolution of the display device.

24. The method as recited in claim 23, wherein the act of counting valid pixels between horizontal sync pulses comprises the act counting a pixel clock.

25. The method as recited in claim 24, wherein the act of counting a pixel clock is driven by a valid pixel signal.

26. The method as recited in claim 25, wherein the valid pixel signal is $DATA_{ENABLE}$.

27. The method as recited in claim 23, wherein the act of counting active horizontal lines between vertical sync pulses comprises the act of counting a horizontal sync pulse qualified with DATA_ENABLE between vertical sync pulses.

28. The method as recited in claim 23, wherein the act of counting active horizontal lines between vertical sync pulses comprises the act of counting DATA_ENABLE between vertical sync pulses.

29. An apparatus to perform mode detection and scaler control in a system with a display controller and a display device, the display device having a scaler circuit for receiving incoming signal resolution and scaling outgoing signal to a display device horizontal resolution and a display device vertical resolution, the apparatus comprising:
a horizontal counter coupled to the display controller output to determine an active horizontal resolution by counting valid pixels between horizontal sync pulses;
a vertical counter coupled to the display controller output to determine an active vertical resolution;
a panel size circuit configured to provide output signals representative of the display device horizontal resolution and the display device vertical resolution; and a control circuit coupled to the horizontal counter, the vertical counter, and the panel size circuit, the control circuit configured to scale the output of the display controller by a horizontal scale factor and a vertical scale factor to match the display device horizontal resolution and the display device vertical resolution, respectively, if either the active horizontal resolution or the active vertical resolution differs from the respective display device horizontal and vertical resolutions.

30. The apparatus as recited in claim 29, wherein the counting of valid pixels comprises counting a pixel clock.

31. The apparatus as recited in claim 30, wherein the counting of the pixel clock is driven by a valid pixel signal.

32. The apparatus as recited in claim 31, wherein the valid pixel signal is DATA_ENABLE.

33. The apparatus as recited in claim 29, wherein the vertical counter is configured to determine the active vertical resolution by counting active horizontal lines between vertical sync pulses.

* * * * *

UNITED STATES PATENT AND TRADEMARK OFFICE
CERTIFICATE OF CORRECTION

PATENT NO. : 6,894,706 B1
APPLICATION NO. : 09/156816
DATED : May 17, 2005
INVENTOR(S) : Paul A. Ward et al.

It is certified that error appears in the above-identified patent and that said Letters Patent is hereby corrected as shown below:

Please replace Figure 6 with the attached Replacement Sheet.

In column 5, line 26, please replace the phrase "horizontal sync signal (HSYNC)" with the phrase --vertical sync signal (VSYNC)--.

Signed and Sealed this

Fifth Day of February, 2008

JON W. DUDAS
*Director of the United States Patent and Trademark Office*